US010773652B2

(12) United States Patent
Harmelink et al.

(10) Patent No.: US 10,773,652 B2
(45) Date of Patent: Sep. 15, 2020

(54) VEHICLE INTERIOR COMPONENT

(71) Applicant: Shanghai Yanfeng Jinqiao Automotive Trim Systems Co. Ltd., Novi, MI (US)

(72) Inventors: Christopher James Harmelink, Wyoming, MI (US); Gregory M. Karbowski, Holland, MI (US); Danny Brian Larsen, Holland, MI (US); Jonathan Alan Dykstra, Holland, MI (US)

(73) Assignee: Shanghai Yanfeng Jinqiao Automotive Trim Systems Co. Ltd., Novi, MI (US)

( * ) Notice: Subject to any disclaimer, the term of this patent is extended or adjusted under 35 U.S.C. 154(b) by 77 days.

(21) Appl. No.: 16/189,531

(22) Filed: Nov. 13, 2018

(65) Prior Publication Data

US 2019/0084486 A1    Mar. 21, 2019

Related U.S. Application Data

(63) Continuation of application No. PCT/US2017/032810, filed on May 16, 2017.
(Continued)

(51) Int. Cl.
*B60R 7/04* (2006.01)
*E05B 83/32* (2014.01)
(Continued)

(52) U.S. Cl.
CPC ............. *B60R 7/04* (2013.01); *B60N 2/793* (2018.02); *B60R 7/06* (2013.01); *B60R 11/00* (2013.01); *E05B 83/32* (2013.01); *E05B 85/107* (2013.01)

(58) Field of Classification Search
CPC .. B60R 7/04; B60R 7/06; B60R 11/00; B60N 2/793; E05B 83/32; E05B 85/107
(Continued)

(56) References Cited

U.S. PATENT DOCUMENTS

| 6,338,352 | B1 | 1/2002 | Raches et al. |
| 6,883,852 | B2 | 4/2005 | Laskey |

(Continued)

FOREIGN PATENT DOCUMENTS

| DE | 102014218412 A1 | 3/2016 |
| WO | 2015123442 A1 | 8/2015 |

OTHER PUBLICATIONS

International Search Report and Written Opinion from the International Searching Authority for International Patent Application No. PCT/US2017/032810 dated Jul. 31, 2017 (in English) (9 pages).

*Primary Examiner* — Joseph D. Pape

(57) ABSTRACT

A vehicle interior component is disclosed. The component may comprise a base, a cover moveable between closed and open positions and a handle. The handle may be retracted when the cover is closed and extended when the cover is open. The handle may move toward the retracted position when the cover moves from the open position to the closed position. The component may comprise a mechanism to engage the base to move the handle. The mechanism may comprise a spring to bias or move the handle. The component may comprise a spring to move the cover from the closed to the open position. The component may comprise at least one of a console, a floor console, a center console, a storage compartment, an arm rest. The cover may comprise at least one of a door, a tambour door, a shade, a blind, a roller blind.

19 Claims, 15 Drawing Sheets

Related U.S. Application Data

(60) Provisional application No. 62/337,689, filed on May 17, 2016.

(51) Int. Cl.
*B60N 2/75* (2018.01)
*B60R 7/06* (2006.01)
*E05B 85/10* (2014.01)
*B60R 11/00* (2006.01)

(58) Field of Classification Search
USPC .............................................. 296/37.8, 24.34
See application file for complete search history.

(56) References Cited

U.S. PATENT DOCUMENTS

| | | | |
|---|---|---|---|
| 9,863,171 B1 * | 1/2018 | Salter | ........................ B60R 7/04 |
| 10,023,088 B2 * | 7/2018 | Anderson | .............. B60N 2/767 |
| 2010/0066113 A1 | 3/2010 | Browne et al. | |
| 2015/0258923 A1 | 9/2015 | Skapof et al. | |
| 2016/0176290 A1 * | 6/2016 | Quijano | .................. B60K 20/04 |
| | | | 296/24.34 |
| 2016/0222705 A1 | 8/2016 | Velicanin | |

\* cited by examiner

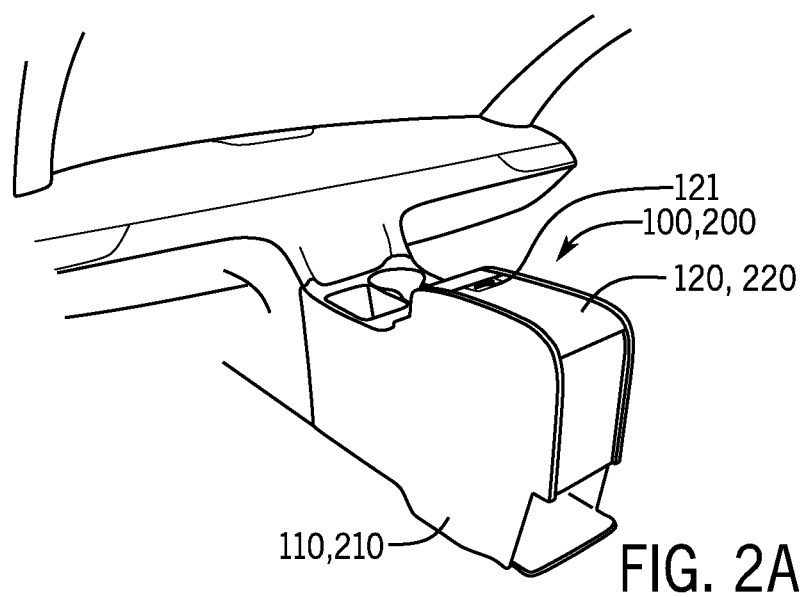
FIG. 2A
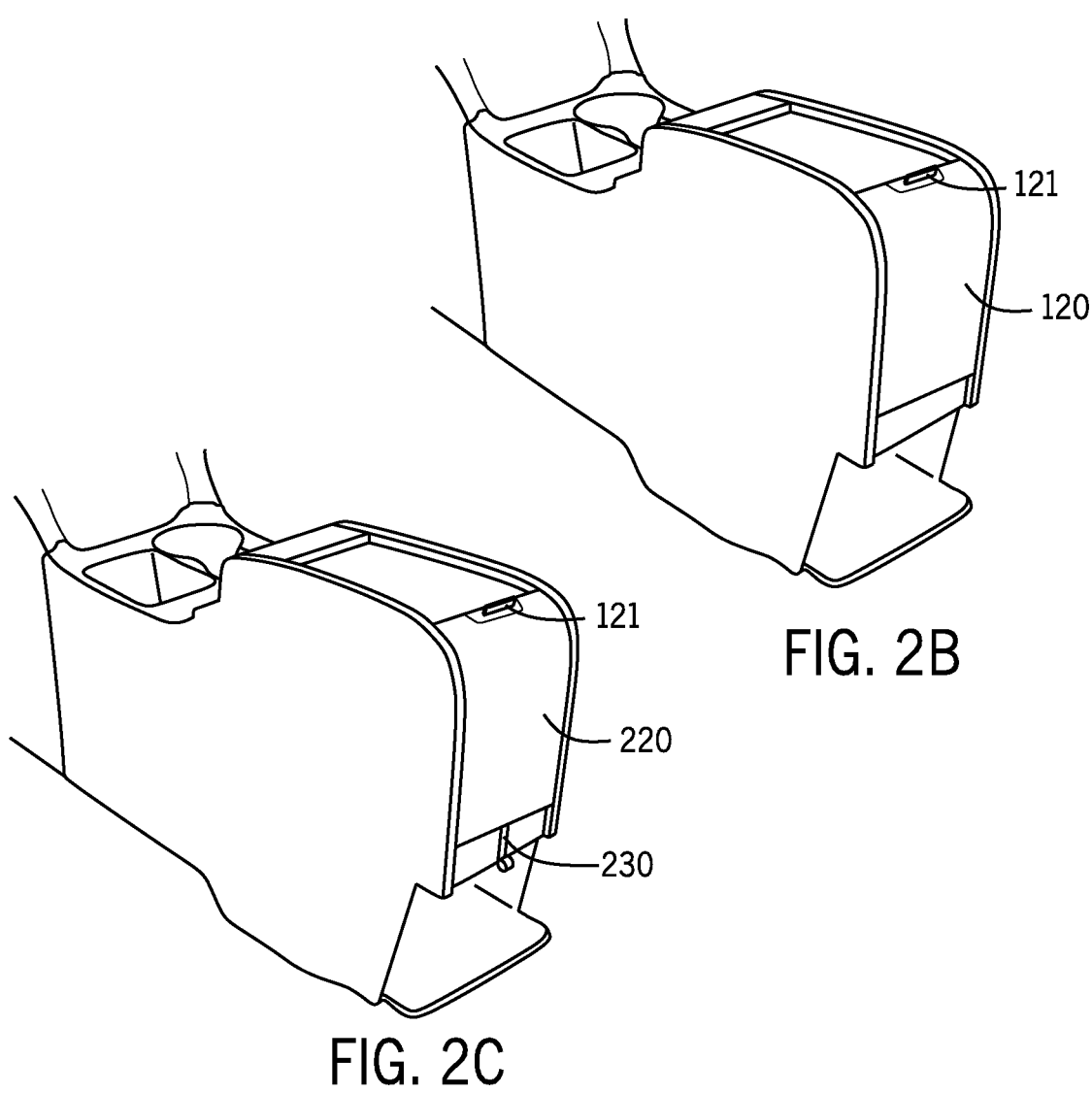
FIG. 2B
FIG. 2C

VEHICLE INTERIOR COMPONENT

CROSS-REFERENCE TO RELATED APPLICATIONS

The present application is a continuation of International/PCT Patent Application No. PCT/US2017/032810 titled "CONSOLE FOR VEHICLE INTERIOR" filed May 16, 2017, which claims the benefit of U.S. Provisional Patent Application No. 62/337,689 titled "Console for Vehicle Interior" filed May 17, 2016.

The present application claims priority to and incorporates by reference in full the following patent application(s): (a) U.S. Provisional Patent Application No. 62/337,689 titled "Console for Vehicle Interior" filed May 17, 2016; (b) International/PCT Patent Application No. PCT/US2017/032810 titled "CONSOLE FOR VEHICLE INTERIOR" filed May 16, 2017.

FIELD

The present invention relates to a vehicle interior component.

BACKGROUND

It is known in motor vehicles to provide a component, trim component or console (e.g. center console, floor console, etc.) for a vehicle interior. It is also known to provide a storage compartment within the component, floor console or center console. It is further known to provide a movable cover (e.g. tambour door) to cover or expose an opening within the component to facilitate access to the storage compartment. It is further known to provide a latch to secure the cover to the component when the cover is in a closed position and to provide a means to unlatch the cover and move the cover from a closed position to an open position. It is further known to provide a handle on the cover to improve ease of moving the cover to expose and cover the opening within the component.

It would be advantageous to provide an improved component for a vehicle interior with a cover comprising a handle that is hidden when the cover is closed. It would also be advantageous to provide the handle for use when the cover is in an open position. It would further be advantageous to provide the handle for use when the cover is disengaged from the closed position.

SUMMARY

The present invention relates to a vehicle interior component comprising a base, a cover coupled to the base configured to move between a closed position and an open position and a handle coupled to the cover configured to move between a retracted position and an extended position. The handle may be configured to be in the retracted position when the cover is in the closed position. The handle may be configured to be in the extended position when the cover is in the open position. The handle may be configured to be moved toward the retracted position when the cover moves from the open position to the closed position. The component may comprise a mechanism configured to move the handle relative to the cover. The mechanism may be configured to move the handle toward the extended position when the cover moves from the closed position toward the open position. The base may comprise a protrusion. The mechanism may be configured to engage the protrusion to move the handle from the retracted position toward the extended position. The mechanism may be configured to engage the protrusion to move the handle from the extended position toward the retracted position. The mechanism may comprise a spring configured to move the handle relative to the cover. The mechanism may comprise a link coupled to the spring and configured to move the handle relative to the cover. The spring may be configured to bias the handle toward the retracted position. The spring may be configured to move the handle from the extended position to the retracted position. The spring may be configured to bias the handle toward the extended position. The spring may be configured to move the handle from the retracted position to the extended position. The component may comprise a spring configured to move the cover from the closed position to the open position. The component may comprise at least one of (a) a console, (b) a floor console, (c) a center console, (d) a storage compartment, (e) an arm rest; the cover may comprise at least one of (a) a door, (b) a tambour door, (c) a shade, (d) a blind, (e) a roller blind.

The present invention relates to a vehicle interior component comprising a base, a cover coupled to the base configured to move between a closed position and an open position, a handle coupled to the cover configured to move between a retracted position and an extended position and a mechanism coupled to the handle. The mechanism may be configured to move the handle relative to the cover. The mechanism may be configured to engage with the base to move the handle toward the extended position. The base may comprise a projection configured to engage the mechanism at the open position. The mechanism may be configured to engage with the base to move the handle toward the retracted position. The base may comprise a projection configured to engage the mechanism at the closed position.

The present invention relates to a vehicle interior component comprising a base comprising a storage compartment, a cover coupled to the base configured to move between a closed position and an open position, a latch configured to engage with the cover to secure the cover to the base and a spring configured to move the cover from the closed position toward the open position. The cover may be configured to cover the storage compartment in the closed position and uncover the storage compartment in the open position. When the latch is disengaged, the spring may move the cover from the closed position toward the open position.

The present invention relates to a vehicle trim component. The component may comprise a base, a cover coupled to the base configured for movement between a closed position and an open position and a handle coupled to the cover. The handle may be configured to move between a retracted position and an extended position; the handle may be configured to move the cover relative to the base. The handle may be configured to be in the retracted position when the cover is in the closed position; the handle may be configured to be in the extended position when the cover is in the open position. The component may comprise a mechanism configured to move the handle relative to the cover; the mechanism may comprise a link and a spring. The link may be coupled to the handle and the spring; the spring may be configured to move the link; the link may be configured to move the handle relative to the cover. The spring may be configured to bias the handle in the retracted position; the spring may be configured to bias the handle in the extended position. The handle may be configured to be in the retracted position when the cover moves from the closed position toward the open position. The base may comprise a protrusion configured to move the handle from the retracted position to the extended position. The component may comprise a first spring; the first spring may be configured to move the handle from the extended position to the retracted position. The component may comprise a spring; the spring may be configured to move the cover from the closed position to the open position. The handle may be configured to be in the extended position when the cover moves from the closed position toward the open position. The handle may be configured to be in the extended position when the cover moves from the open position toward the closed position. The base may comprise a protrusion configured to move the handle from the extended position to the retracted position. The component may comprise a spring; the spring may be configured to move the handle from the retracted position to the extended position. The base may comprise a storage compartment; the cover may be configured to cover the storage compartment in the closed position and uncover the storage compartment in the open position. The component may comprise at least one of (a) a console, (b) a floor console, (c) a center console, (d) a storage compartment, (e) an arm rest; the cover may comprise at least one of (a) a door, (b) a tambour door, (c) a shade, (d) a blind, (e) a roller blind. The component may comprise a latch configured to engage with the cover to secure the cover to the base; the cover may be configured to move from the closed position to the open position when the cover is disengaged from the latch.

The present invention relates to a vehicle trim component. The component may comprise a base, a cover coupled to the base configured for movement between a closed position and an open position, a handle coupled to the cover and a mechanism configured to move the handle relative to the cover between a retracted position and an extended position.

The present invention relates to a vehicle trim component. The component may comprise a base, a cover coupled to the base configured for movement between a closed position and an open position, and a spring configured to move the cover from the closed position to the open position.

FIGURES

FIG. 2A is a schematic perspective partial view of a vehicle interior showing a vehicle interior component with a cover in a closed position according to an exemplary embodiment.

FIG. 2B is a schematic perspective view of a vehicle interior component with a cover in an open position according to an exemplary embodiment.

FIG. 2C is a schematic perspective view of a vehicle interior component including a self-opening mechanism according to an exemplary embodiment.

DESCRIPTION

Figure 1A:
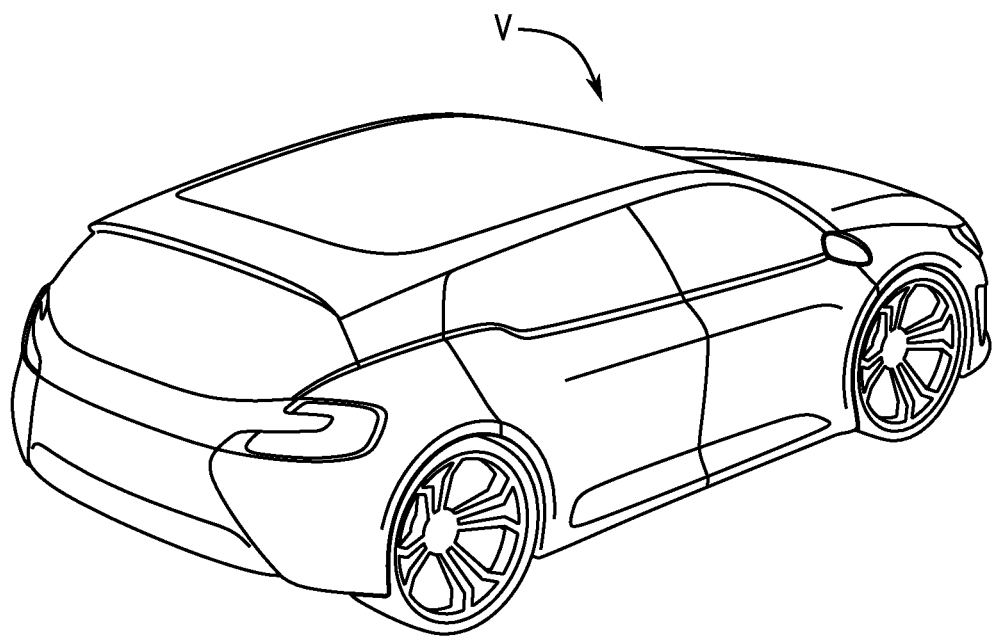
FIG. 1A is a schematic perspective view of a vehicle according to an exemplary embodiment.
Figure 1B:
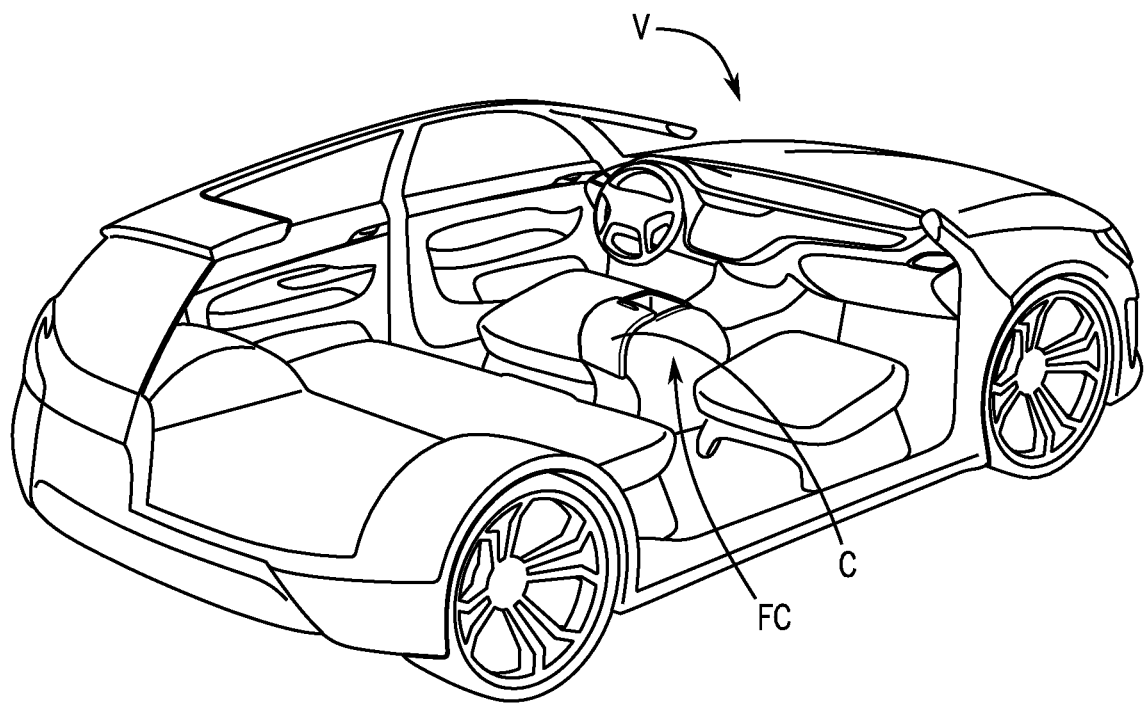
FIG. 1B is a schematic perspective cut-away view of a vehicle showing a vehicle interior according to an exemplary embodiment.

According to an exemplary embodiment as shown schematically in FIGS. 1A and 1B, a vehicle V is shown including an interior with a floor console FC. Floor console FC may comprise a cover C and a storage compartment within floor console FC. Cover C may be configured to move between an open position and a closed position to facilitate access to the storage compartment.

According to an exemplary embodiment as shown schematically in FIGS. 2A-2C, 3, 4A-4F, 5A-5F, 6A, 6B, 7, 8A-8F, 9A-9F, 10A, 10B, 11, 12A-12H and 13A-13C, a vehicle interior component 100/200/300 may comprise a base 110/210/310, a cover 120/220/320 coupled to base 110/210/310 configured to move between a closed position as shown schematically in FIGS. 2A, 4A, 5E, 5F, 6A, 8A, 9E, 9F 10A, 12A and 12H and an open position as shown schematically in FIGS. 2B, 2C, 4E, 4F, 5A, 5B, 6B, 8E, 8F, 9A, 9B and 12E and a handle 121/321 coupled to cover 120/220/320 configured to move between a retracted position as shown schematically in FIGS. 2A, 4A-4D, 5E, 5F, 6A, 8A-8D, 9E, 9F 10A, 12A, 12H and 13A and an extended position as shown schematically in FIGS. 2B, 2C, 4E, 4F, 5A-5D, 6B, 8E, 8F, 9A-9D, 10B, 12C-12G, 13B and 13C. Handle 121/321 may be configured to be in the retracted position when cover 120/220/320 is in the closed position. Handle 121/321 may be configured to be in the extended position when cover 120/220/320 is in the open position. Handle 121/321 may be configured to be moved toward the retracted position when cover 120/220/320 moves from the open position to the closed position. Component 100/200/300 may comprise a mechanism 124/324 configured to move handle 121/321 relative to cover 120/220/320. Mechanism 124/324 may be configured to move handle 121/321 toward the extended position when cover 120/220/320 moves from the closed position toward the open position as shown schematically in FIGS. 6A and 6B. Mechanism 124/324 may comprise a spring 128/328 configured to move handle 121/321 relative to cover 120/220/320. Mechanism 124/324 may comprise a link 127/327 coupled to spring 128/328 and configured to move handle 121/321 relative to cover 120/220/320. Component 100/200/300 may comprise at least one of (a) a console, (b) a floor console, (c) a center console, (d) a storage compartment, (e) an arm rest; the cover may comprise at least one of (a) a door, (b) a tambour door, (c) a shade, (d) a blind, (e) a roller blind.

According to an exemplary embodiment as shown schematically in FIGS. 2A-2C, 3, 4A-4F, 5A-5F, 6A, 6B, 7, 8A-8F and 9A-9F, base 110/210 may comprise a protrusion 113/213. Mechanism 124 may be configured to engage protrusion 113 to move handle 121 from the retracted position toward the extended position as shown schematically in FIGS. 6A and 6B. Mechanism 124 may comprise a spring 128 configured to move handle 121 relative to cover 120/220. Mechanism 124 may comprise a link 127 coupled to spring 128 and configured to move handle 121 relative to cover 120/220/320. Spring 128 may be configured to bias handle 121 toward the retracted position as shown schematically in FIG. 6A. Spring 128 may be configured to move handle 121 from the extended position to the retracted position.

According to an exemplary embodiment as shown schematically in FIGS. 2A-2C, 7, 8A-8F and 9A-9F, component 200 may comprise a spring 230 configured to move cover 220 from the closed position to the open position.

According to an exemplary embodiment as shown schematically in FIGS. 10A, 10B, 11, 12A-12H and 13A-13C, base 310 may comprise a protrusion 313. Mechanism 324 may be configured to engage protrusion 313 to move handle 321 from the extended position toward the retracted position as shown schematically in FIG. 13A. Mechanism 324 may comprise a spring 328 configured to move handle 321 relative to cover 320. Mechanism 324 may comprise a link 327 coupled to spring 328 and configured to move handle 321 relative to cover 320. Spring 328 may be configured to bias handle 321 toward the extended position. Spring 328 may be configured to move handle 321 from the retracted position to the extended position as shown schematically in FIGS. 13A-13C.

According to an exemplary embodiment as shown schematically in FIGS. 2A-2C, 3, 4A-4F, 5A-5F, 6A, 6B, 7, 8A-8F, 9A-9F, 10A, 10B, 11, 12A-12H and 13A-13C, a vehicle interior component 100/200/300 may comprise a base 110/210/310, a cover 120/220/320 coupled to base 110/210/310 configured to move between a closed position as shown schematically in FIGS. 2A, 4A, 5E, 5F, 6A, 8A, 9E, 9F 10A, 12A and 12H and an open position as shown schematically in FIGS. 2B, 2C, 4E, 4F, 5A, 5B, 6B, 8E, 8F, 9A, 9B and 12E, a handle 121/321 coupled to cover 120/220/320 configured to move between a retracted position as shown schematically in FIGS. 2A, 4A-4D, 5E, 5F, 6A, 8A-8D, 9E, 9F 10A, 12A, 12H and an extended position as shown schematically in FIGS. 2B, 2C, 4E, 4F, 5A-5D, 6B, 8E, 8F, 9A-9D, 10B, 12C-12G, 13B and 13C and a mechanism 124/324 coupled to handle 121/321. Mechanism 124/324 may be configured to move handle 121/321 relative to cover 120/220/320.

According to an exemplary embodiment as shown schematically in FIGS. 2A-2C, 3, 4A-4F, 5A-5F, 6A, 6B, 7, 8A-8F and 9A-9F, mechanism 124 may be configured to engage with base 110/210 to move handle 121 toward the extended position. Base 110 may comprise a projection 113 configured to engage mechanism 124 at the open position as shown schematically in FIG. 6B.

According to an exemplary embodiment as shown schematically in FIGS. 10A, 10B, 11, 12A-12H and 13A-13C, mechanism 324 may be configured to engage with base 310 to move handle 321 toward the retracted position. Base 310 may comprise a projection 313 configured to engage mechanism 324 at the closed position as shown schematically in FIG. 13A.

According to an exemplary embodiment as shown schematically in FIGS. 2A-2C, 7, 8A-8F and 9A-9F, a vehicle interior component 200 may comprise a base 210 comprising a storage compartment, a cover 220 coupled to base 210 configured to move between a closed position and an open position, a latch 215 configured to engage with cover 220 to secure cover 220 to base 210 and a spring 230 configured to move cover 220 from the closed position toward the open position. Cover 220 may be configured to cover the storage compartment in the closed position and uncover the storage compartment in the open position. When latch 215 is disengaged, spring 23 may move cover 220 from the closed position toward the open position.

According to an exemplary embodiment as shown schematically in FIG. 2A, a vehicle interior component 100/200 may comprise a base 110/210, a cover 120/220 and a handle 121. Cover 120/220 may be coupled to base 110/210 and may be configured to move between a closed position as shown schematically in FIG. 2A and an open position as shown schematically in FIGS. 2B and 2C. According to an exemplary embodiment, base 110/210 may comprise a storage compartment, and cover 110/210 may be configured to cover the storage compartment in the closed position and uncover the storage compartment in the open position.

According to an exemplary embodiment as shown schematically in FIGS. 2B and 2C, cover 120/220 may be configured to slide towards the open position. Handle 121 may be configured to move between a retracted position and an extended position. Handle 121 may be configured to move cover 120/220 relative to base 110/210. Handle 121 may be configured to move cover 120, 220 from the open position towards the closed position. As shown schematically in FIG. 2B, handle 121 may be exposed at the extended position when cover 120 is at the open position. As shown schematically in FIG. 2C, handle 121 may be exposed at the extended position when cover 220 is at the open position. Handle 121 may be configured to be in the retracted position when cover 220 is in the closed position and in the extended position when cover 220 is at the open position. Handle 121 may be configured to move cover 220 from the open position towards the closed position.

Figure 3:
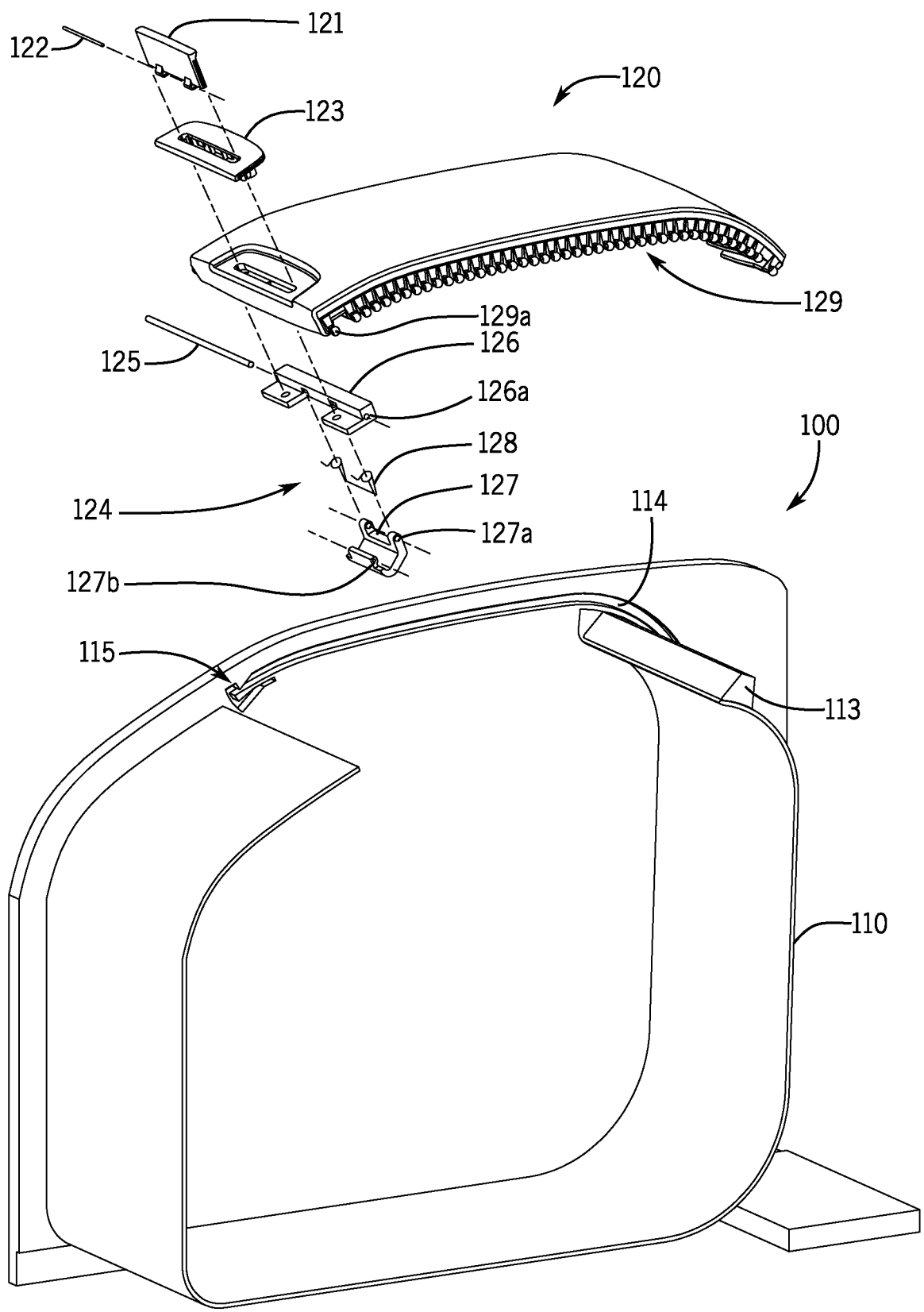
FIG. 3 is a schematic perspective exploded partial view of a vehicle interior component according to an exemplary embodiment.
Figure 4A:
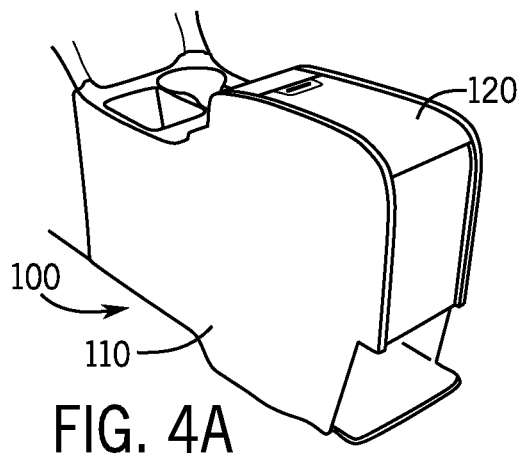
FIGS. 4A to 4E are schematic perspective views of a vehicle interior component according to an exemplary embodiment.
Figure 4B:
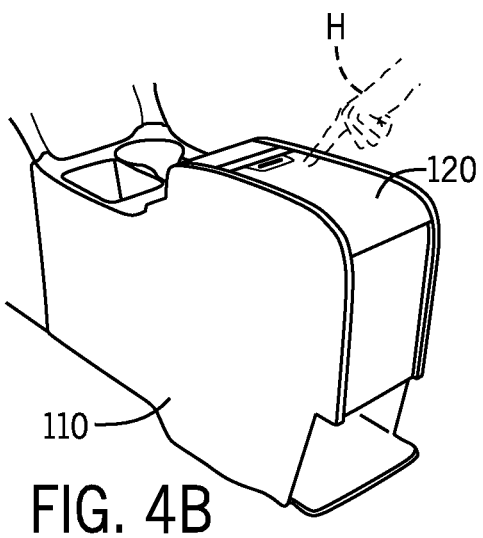
Figure 4C:
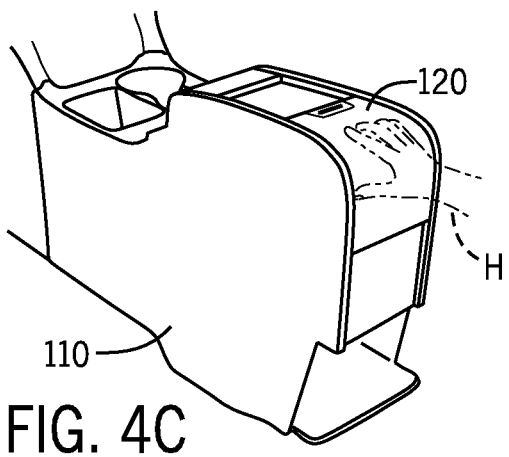
Figure 4D:
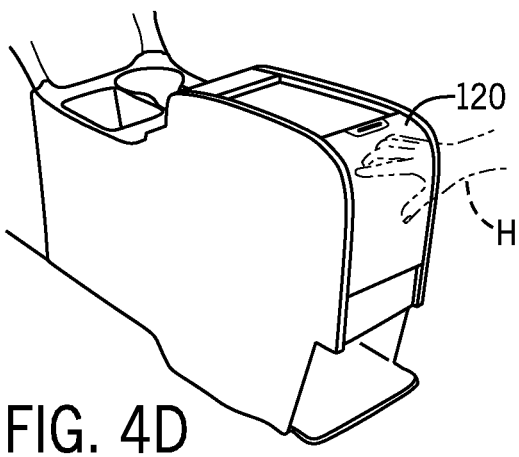
Figure 4E:
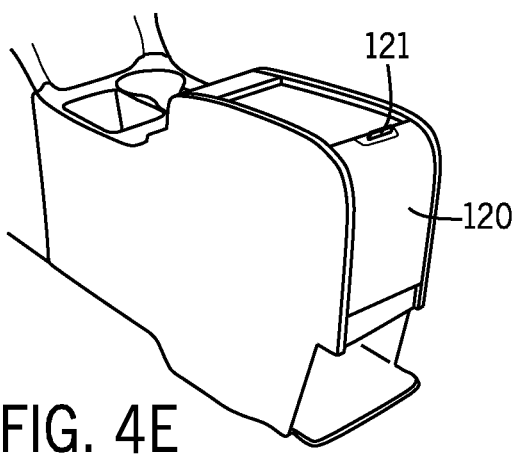
Figure 4F:
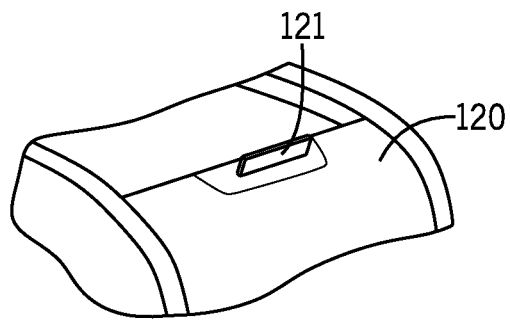
FIG. 4F is a schematic partial perspective view of a vehicle interior component according to an exemplary embodiment.
Figure 5A:
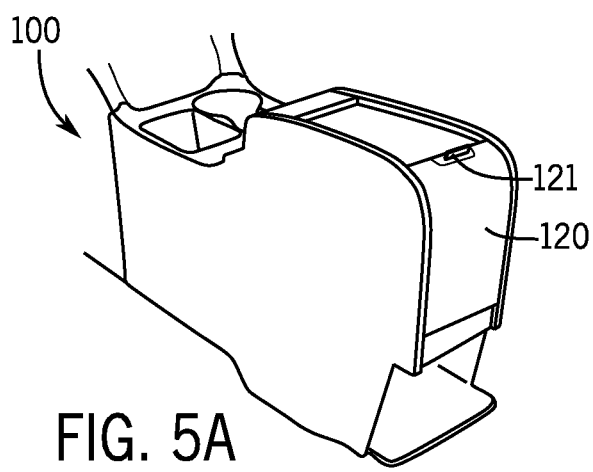
FIGS. 5A to 5F are schematic perspective views of a vehicle interior component according to an exemplary embodiment.
Figure 5B:
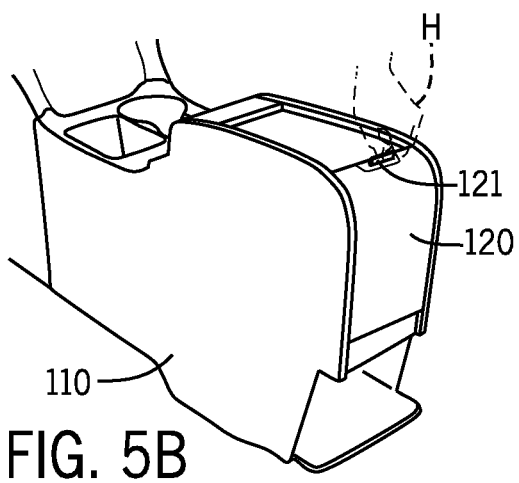
Figure 5C:
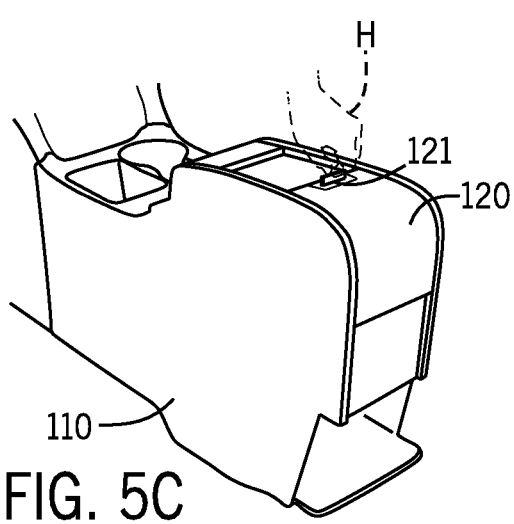
Figure 5D:
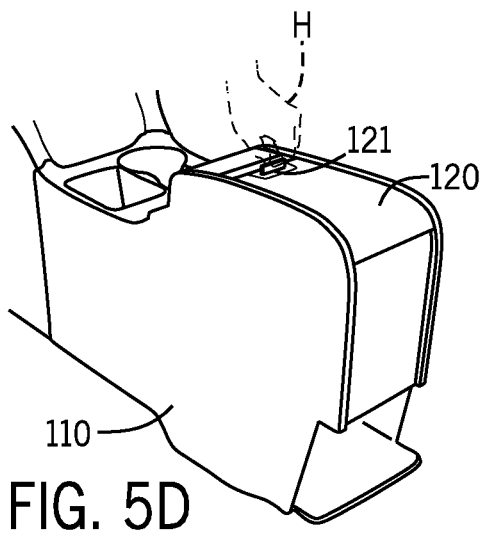
Figure 5E:
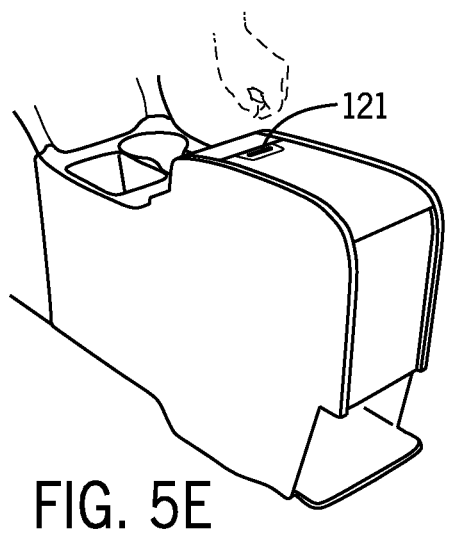
Figure 5F:
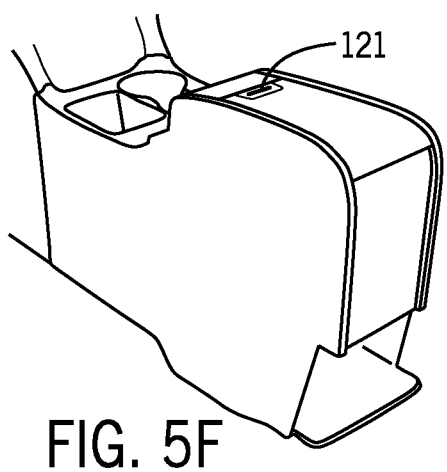

According to an exemplary embodiment as shown schematically in FIG. 3, a vehicle interior component 100 (e.g. console, floor console, center console, storage compartment, arm rest, etc.) may comprise a base 110, a cover 120 (e.g. door, tambour door, shade, blind, roller blind, etc.), a handle 121, a plate or bezel 123 and a mechanism 124. According to an exemplary embodiment, base 110 may comprise a protrusion 113 and a track 114. According to an exemplary embodiment track 114 may comprise a latch 115.

According to an exemplary embodiment as shown schematically in FIG. 3, cover 120 may comprise a plurality of ribs 129 including a forward-most rib 129a offset from the rest of the plurality of ribs 129. Cover 120 may be configured to rest in track 114. The plurality of ribs 129 may be aligned parallel to each other and may be configured to conform to the curvature of track 114 on base 110. Each rib of the plurality of ribs 129 may comprise opposing protrusions configured to engage with track 114 to slide cover 120 between a closed position and an open position. According to an exemplary embodiment, forward-most rib 129*a* may be configured to engage with latch 115 to secure cover 120 in the closed position.

According to an exemplary embodiment, handle 121 may be configured to move between a retracted position and an extended position and to facilitate movement of cover 120 between the open position and the closed position. Handle 121 may be flush-fit with cover 120 when handle 121 is in the retracted position and cover 120 is at the closed position. According to an exemplary embodiment, handle 121 may be exposed to a vehicle occupant to facilitate movement of cover 120 when handle 121 is in the extended position.

According to an exemplary embodiment as show schematically in FIG. 3, mechanism 124 may comprise a bracket 126, a spring or torsion spring 128, and a link 127 (e.g. member, pivot arm, pivot member etc.). Mechanism 124 may be configured to move handle 121 relative to the cover 120. According to an exemplary embodiment, link 127 may be coupled to handle 121 and spring 128. Spring 128 may be configured to move link 127 relative to cover 121. Bracket 126 may comprise a hole 126*a* and link 127 may comprise holes 127*a* and 127*b*. According to an exemplary embodiment, bracket 126, spring 128, and link 127 may be configured in a first hinge arrangement. The first hinge arrangement may be formed by inserting a pin 125 into hole 126*a* through spring 128 and hole 127*a*. According to an exemplary embodiment, spring 128 may be configured to provide tension on the first hinge arrangement. According to an exemplary embodiment, spring 128 may be configured to bias handle 121 in the retracted position. According to an exemplary embodiment, spring 128 may be configured to move handle 121 form the extended position to the retracted position.

According to an exemplary embodiment as show schematically in FIG. 3, bracket 126 may be mounted to an underside of cover 120. Bracket 126 may be rigidly attached to the underside of cover 120 and may be configured to move together with cover 120. According to an exemplary embodiment, a second hinge arrangement may be formed by inserting a pin 122 into holes on handle 121 and a hole 127*b* on link 127. Rotation of link 127 may facilitate movement of handle 121 between the retracted position and the extended position. Link 127 may be configured to engage with protrusion 113 on base 110 to stop cover 120 at the open position. According to an exemplary embodiment, when cover 120 is at the open position, protrusion 113 may engage with link 127 to rotate link 127, with handle 121 being pushed towards the extended position. Protrusion 113 may be configured to move handle 121 from the retracted position to the extended position.

According to an exemplary embodiment, plate 123 may be attached to cover 120 between handle 121 and bracket 126 and may be configured to host handle 121. According to an exemplary embodiment, plate 123 may be configured to be flush with cover 120 when handle 121 is in the retracted position and provide a passage for handle 121 to move between the retracted position and the extended position.

According to an exemplary embodiment as shown schematically in FIGS. 4A to 4E, cover 120 of vehicle interior component 100 may move between the closed position and the open position. As shown schematically in FIG. 4A, cover 120 is at the closed position and is secured to base 110 by latch 115 and forward-most rib 129*a*. (See FIG. 3). As shown schematically in FIG. 4B, a downward force or press on cover 120 may be applied by a hand H to disengage cover 120 from base 110 and allow free movement of cover 120 out of the closed position. As shown schematically in FIGS. 4C and 4D, cover 120 is partially open. Cover 120 may progressively move towards the open position. As shown schematically in FIGS. 4E and 4F, cover 120 is at the open position and handle 121 is in the extended position. According to an exemplary embodiment, handle 121 may be configured to facilitate movement of cover 120 between the open position and the closed position.

As shown schematically in FIGS. 5A to 5F, cover 120 may be configured to move from the open position to the closed position. As shown schematically in FIGS. 5A and 5B, cover 120 is shown at the open position relative to base 110 of vehicle interior component 100. As shown schematically in FIGS. 5B to 5D, handle 121 is shown at the extended position. Hand H may grip onto handle 121 and move cover 120 from the open position towards the closed position. As shown schematically in FIGS. 5E and 5F, cover 120 is shown at the closed position and handle 121 is shown in the retracted position providing a flush-fit appearance on the visible surface of cover 120. According to an exemplary embodiment as shown schematically in FIGS. 5B through 5D, hand H may provide force to keep handle 121 in the extended position until cover 120 is in the closed position.

Figure 6A:
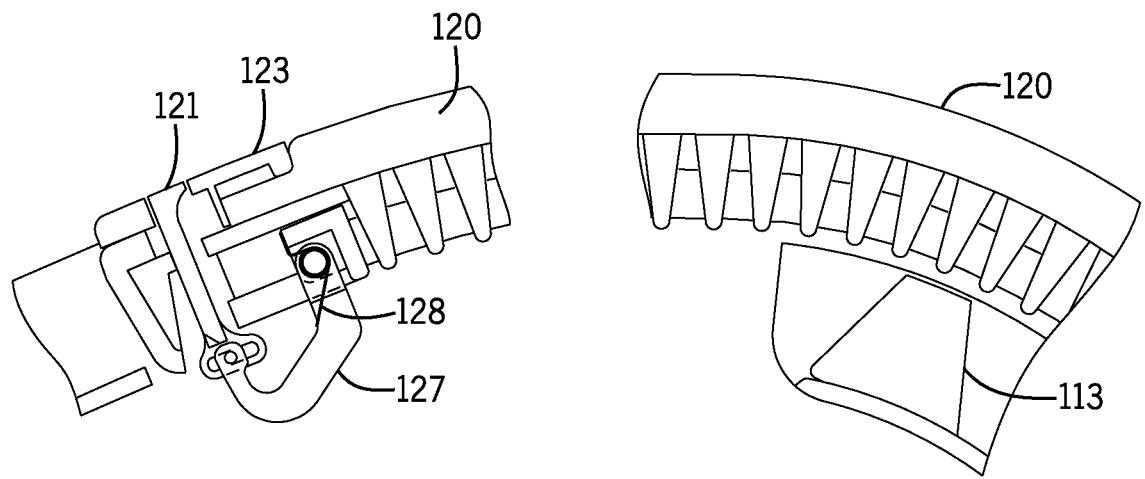
FIGS. 6A and 6B are schematic partial side views of a vehicle interior component according to an exemplary embodiment.
Figure 6B:
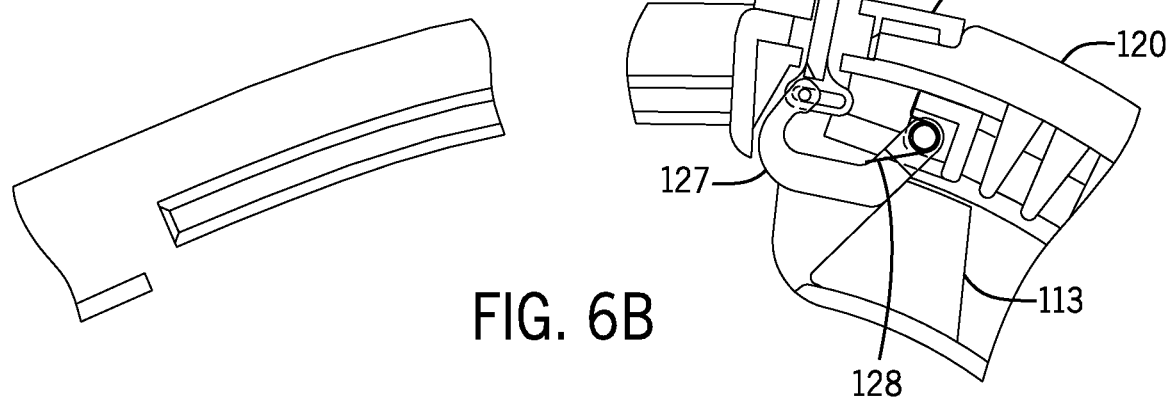

According to an exemplary embodiment as shown schematically in FIGS. 6A and 6B, cover 120 may be configured to slide between the closed position and the open position. (See also FIGS. 4A to 4F). As shown schematically in FIG. 6A, cover 120 is shown at the closed position, handle 121 is shown in the retracted position, and link 127 is not engaged with protrusion 113. Handle 121 may be substantially aligned with plate 123 providing a flush-fit appearance on the visible side of the cover 120. Spring 128 may be engaged with link 127 keeping handle 121 at the retracted position. According to an exemplary embodiment, link 127 may be configured to translate the substantially horizontal motion of cover 120 into substantially vertical motion of handle 121. As shown schematically in FIG. 6B, cover 120 is shown at the open position and handle 121 is shown in the extended position. Protrusion 113 may be engaged with link 127 to rotate link 127 in a direction to push handle 121 to the extended position. According to an exemplary embodiment, spring 128 may be configured to provide tension to keep handle 121 at the retracted position (i.e. to prevent handle 121 from being exposed) absent a force applied to rotate link 127.

According to an exemplary embodiment, as shown schematically in FIG. 6B, engagement between protrusion 113 and link 127 may provide force to overcome tension from spring 128. Link 127 may be rotated by protrusion 113 in a direction to push handle 121 toward the extended position. Engagement between link 127 and protrusion 113 may keep handle 121 in the extended position. According to an exemplary embodiment, handle 121 may be configured to facilitate movement of cover 120 between the open position and the closed position. A vehicle occupant may grip onto handle 121 during the movement of cover 120 to keep handle 121 from returning to the retracted position. (See FIGS. 5A to 5F).

Figure 7:
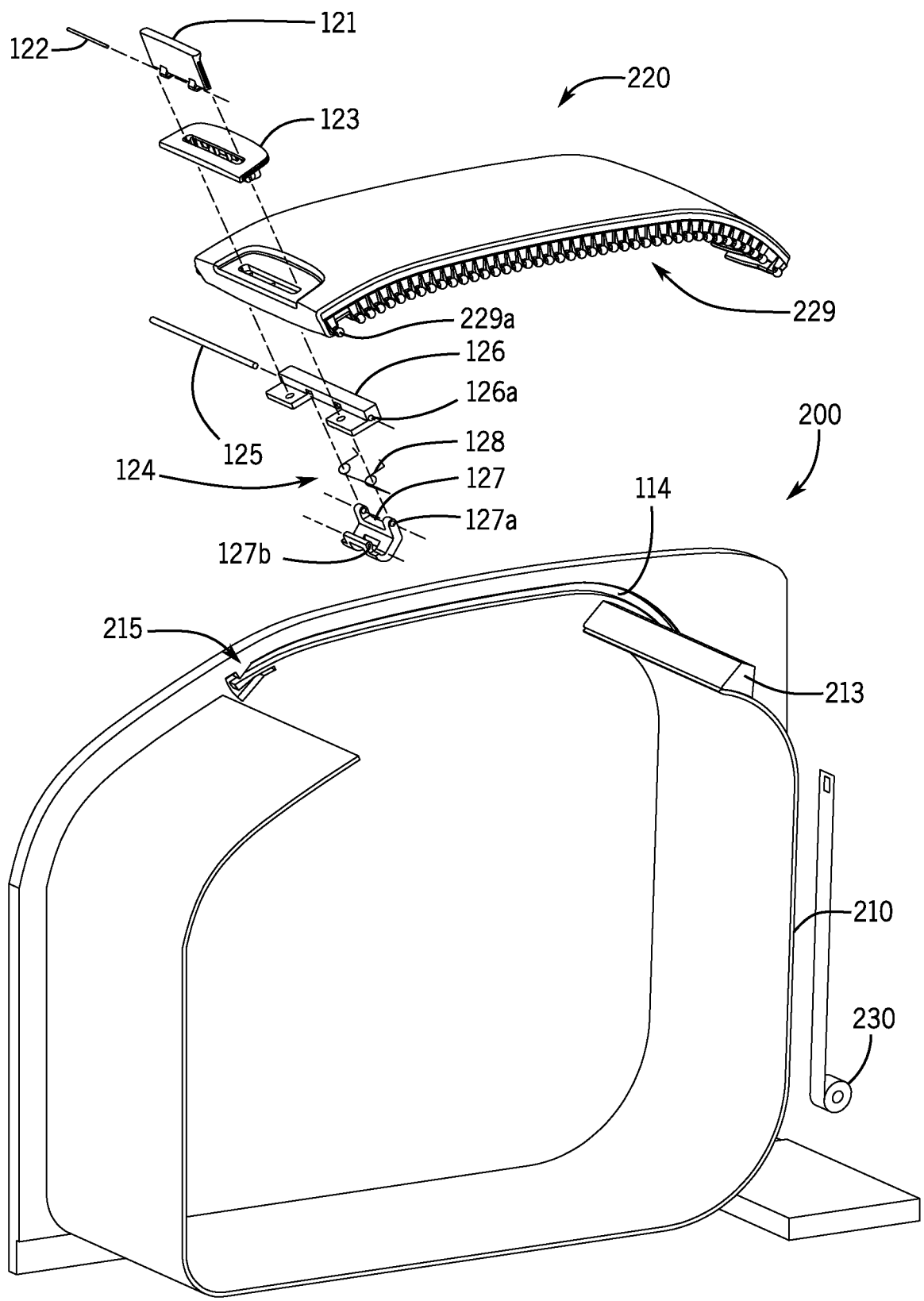
FIG. 7 is a schematic perspective exploded partial view of a vehicle interior component according to an exemplary embodiment.
Figure 8A:
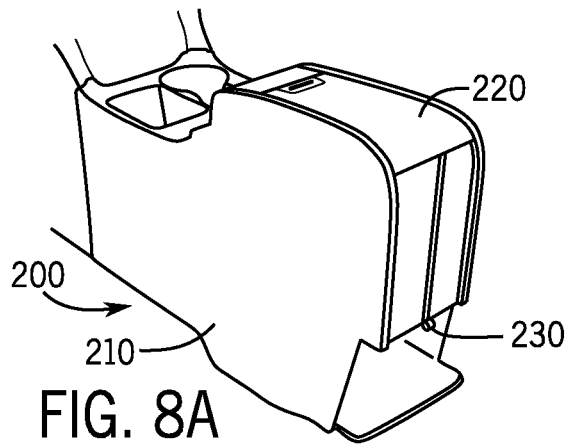
FIGS. 8A to 8E are schematic perspective views of a vehicle interior component according to an exemplary embodiment.
Figure 8B:
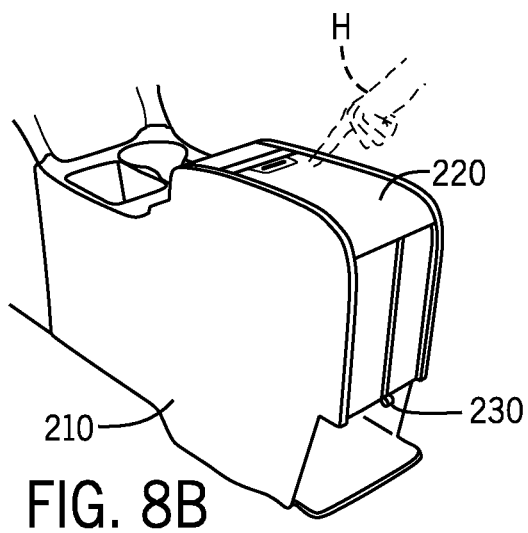
Figure 8C:
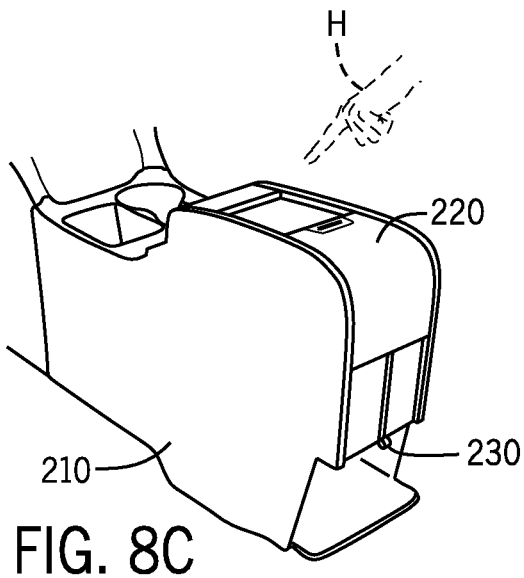
Figure 8D:
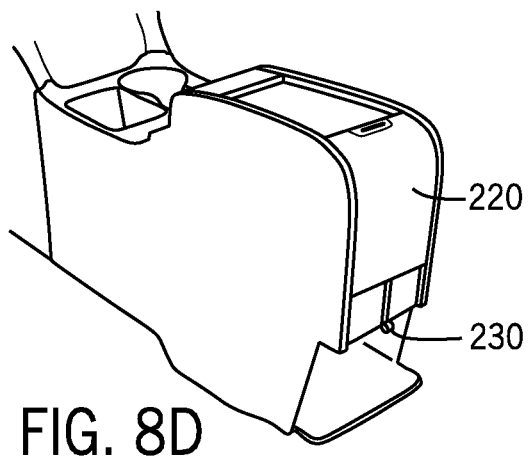
Figure 8E:
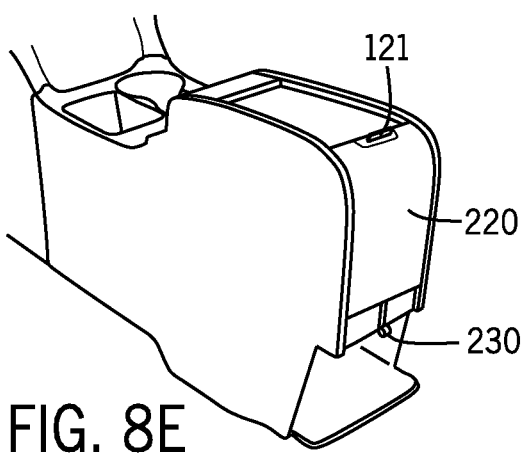
Figure 8F:
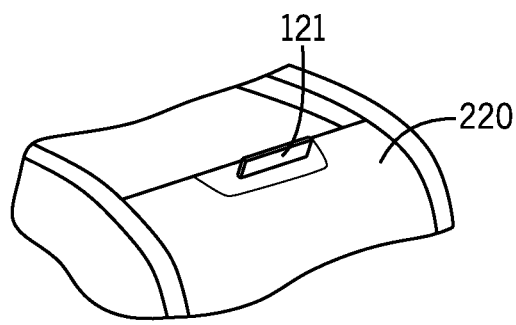
FIG. 8F is a schematic partial perspective view of a vehicle interior component according to an exemplary embodiment.
Figure 9A:
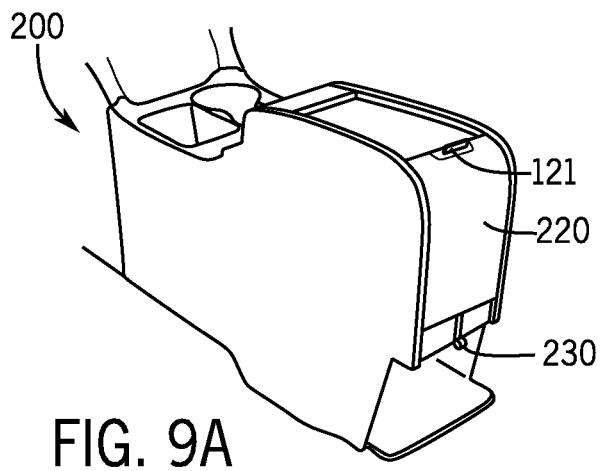
FIGS. 9A to 9F are schematic perspective views of a vehicle interior component according to an exemplary embodiment.
Figure 9B:
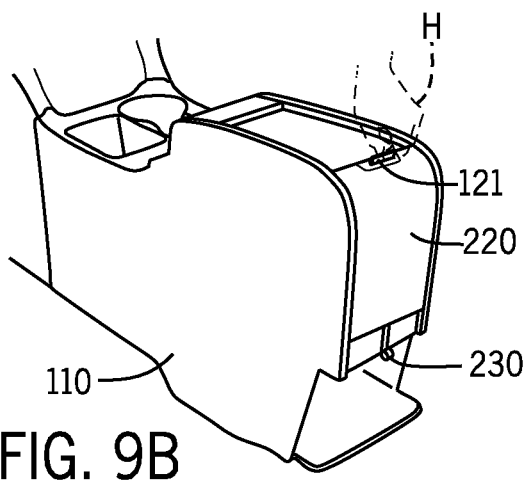
Figure 9C:
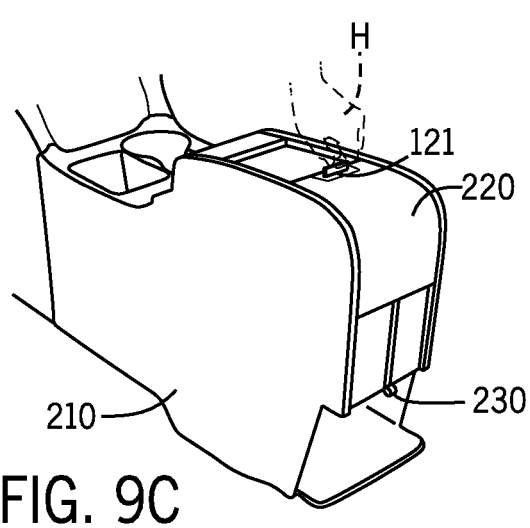
Figure 9D:
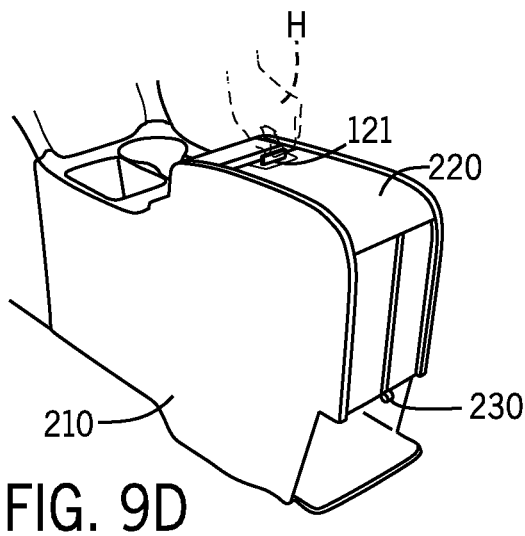
Figure 9E:
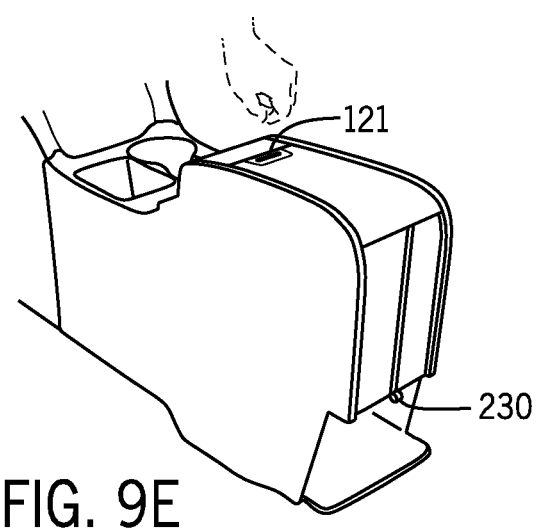
Figure 9F:
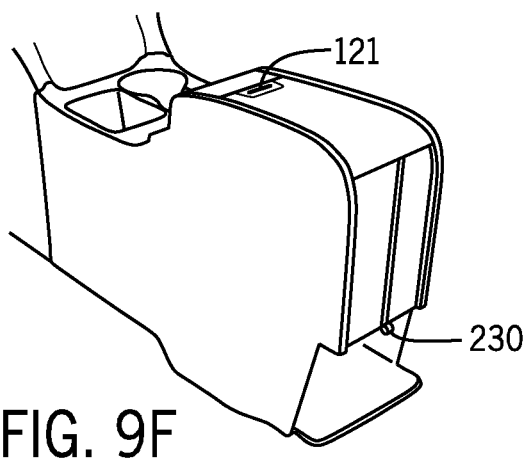

According to an exemplary embodiment as shown schematically in FIG. 7, a vehicle interior component 200 (e.g. console, floor console, center console, storage compartment, arm rest, etc.) may comprise a base 210, a cover 220 (e.g. door, tambour door, shade, blind, roller blind, etc.), a handle 121, a plate or bezel 123 and a mechanism 124. According to an exemplary embodiment, base 210 may comprise a protrusion 213, a track 214, and a self-opening mechanism or spring 230. According to an exemplary embodiment track 214 may comprise a latch 215. According to an exemplary embodiment, self-opening mechanism or spring 230 may be coupled to cover 120. Self-opening mechanism 230 may comprise one of a tape spring, a coil spring, a torsion spring.

According to an exemplary embodiment as shown schematically in FIG. 7, cover 220 may comprise a plurality of ribs 229 including a forward-most rib 229a offset from the rest of the plurality of ribs 229. Cover 220 may be configured to rest in track 214. Plurality of ribs 229 may be aligned parallel to each other and may be configured to conform to the curvature of track 214 on base 210. Each rib of the plurality of ribs 229 may comprise opposing protrusions configured to engage with track 214 to slide cover 220 between a closed position and an open position. According to an exemplary embodiment, forward-most rib 229a may be configured to engage with latch 215 to secure cover 220 in the closed position.

According to an exemplary embodiment as shown schematically in FIG. 7, handle 121 may be configured to move between a retracted position and an extended position and to facilitate movement of cover 220 between the open position and the closed position. Handle 121 may be flush-fit with cover 220 when handle 121 is in the retracted position and cover 220 is at the closed position. According to an exemplary embodiment, handle 121 may be exposed to a vehicle occupant to facilitate movement of cover 220 when handle 121 is in the extended position.

According to an exemplary embodiment as show schematically in FIG. 7, mechanism 124 may comprise a bracket 126, a spring or torsion spring 128, and a link 127 (e.g. member, pivot arm, pivot member etc.). Mechanism 124 may be configured to move handle 121 relative to cover 220. According to an exemplary embodiment, link 127 may be coupled to handle 121 and spring 128. Spring 128 may be configured to move link 127 relative to cover 221. Bracket 126 may comprise a hole 126a and link 127 may comprise holes 127a and 127b. According to an exemplary embodiment, bracket 126, spring 128, and link 127 may be configured in a first hinge arrangement. The first hinge arrangement may be formed by inserting a pin 125 into hole 126a through spring 128 and hole 127a. According to an exemplary embodiment, spring 128 may be configured to provide tension on the first hinge arrangement. According to an exemplary embodiment, spring 128 may be configured to bias handle 121 in the retracted position. According to an exemplary embodiment, spring 128 may be configured to move handle 121 from the extended position to the retracted position.

According to an exemplary embodiment as show schematically in FIG. 7, bracket 126 may be mounted to an underside of cover 220. According to an exemplary embodiment, bracket 126 may be rigidly attached to an underside of cover 220 and may be configured to move together with cover 220. According to an exemplary embodiment, a second hinge arrangement may be formed by inserting a pin 122 into holes on handle 121 and a hole 127b on link 127. Rotation of link 127 may facilitate movement of handle 121 between the retracted position and the extended position. Link 127 may be configured to engage with protrusion 213 on base 210 to stop cover 220 at the open position. According to an exemplary embodiment, when cover 220 is at the open position, protrusion 213 may engage with link 127 to rotate link 127, pushing handle 121 towards the extended position. Protrusion 213 may be configured to move handle 121 from the retracted position to the extended position.

According to an exemplary embodiment as shown schematically in FIG. 7, plate 123 may be attached to cover 220 between handle 121 and bracket 126 and may be configured to host handle 121. According to an exemplary embodiment, plate 123 may be configured to be flush with cover 120 when handle 121 is in the retracted position and provide a passage for handle 121 to move between the retracted position and the extended position.

According to an exemplary embodiment as shown schematically in FIGS. 8A to 8E, cover 220 of vehicle interior component 200 may move between the closed position and the open position by self-opening mechanism or spring 230. Self-opening mechanism or spring 230 may be configured to move cover 220 from the closed position to the open position when cover 220 is disengaged from latch 215. As shown schematically in FIG. 8A, cover 220 is shown in the closed position and secured to base 210 by latch 215 and forward-most rib 229a. (See FIG. 7). As shown schematically in FIG. 8B, a force or press on cover 220 may be applied by a hand H to disengage cover 220 from base 210 and allow free movement of cover 220 out of the closed position. As shown schematically in FIGS. 8C and 8D, cover 220 is shown partially open. Cover 220 may be progressively moved towards the open position by self-opening mechanism 230. As shown schematically in FIGS. 8E and 8F, cover 220 is shown at the open position and handle 121 is shown in the extended position. According to an exemplary embodiment, handle 121 may be configured to facilitate movement of cover 220 between the open position and the closed position. According to an exemplary embodiment, self-opening mechanism 230 may ensure cover 220 reaches the fully open position such that link 127 may be rotated by protrusion 213 and handle 121 is placed into the extended position.

According to an exemplary embodiment as shown schematically in FIGS. 9A to 9F, cover 220 may be configured to move from the open position to the closed position. As shown schematically in FIGS. 9A and 9B, cover 220 is shown at the open position relative to base 210 of vehicle interior component 200. As shown schematically in FIGS. 9A to 9D, handle 121 is shown in the extended position. Hand H may grip onto handle 121 and move cover 220 from the open position towards the closed position. As shown schematically in FIGS. 9E and 9F, cover 220 is shown at the closed position and handle 121 is shown in the retracted position to provide a flush-fit appearance on the visible surface of cover 220. According to an exemplary embodiment, hand H may provide force to keep handle 121 in the extended position until cover 220 is at the closed position. According to an exemplary embodiment, as hand H moves cover 220 from the open position to the closed position, hand H may provide force to overcome force applied by self-opening mechanism 230 to move cover 220 from the closed position to the open position.

Figure 10A:
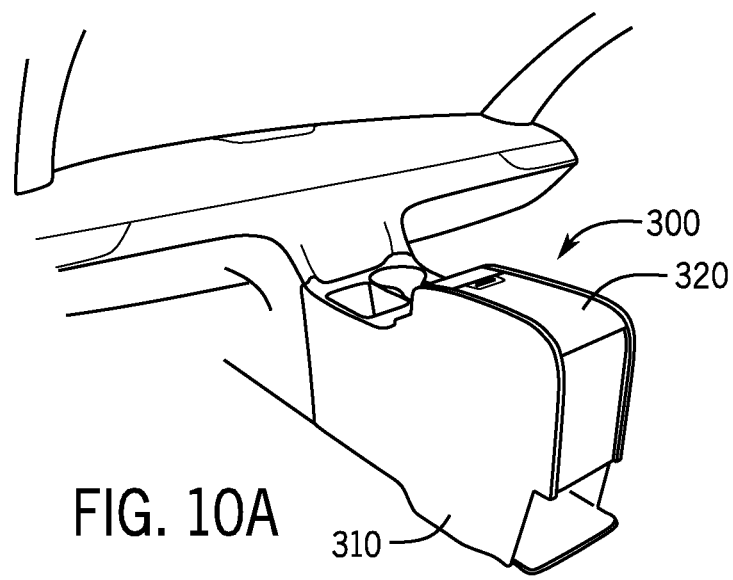
FIGS. 10A and 10B are schematic perspective partial views of a vehicle interior showing a vehicle interior component according to an exemplary embodiment.
Figure 10B:
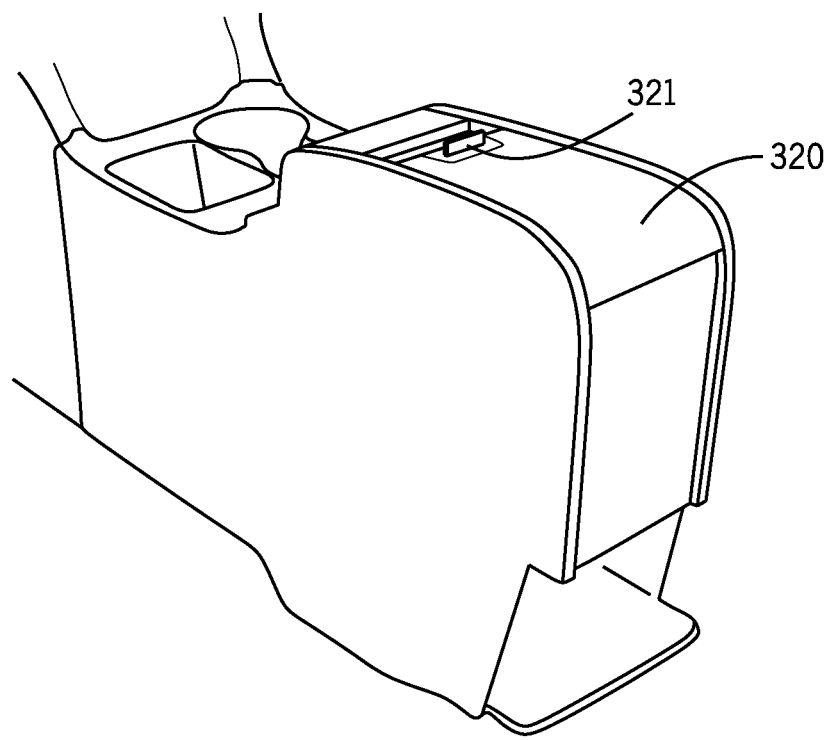

As shown schematically in FIGS. 10A and 10B, a vehicle interior component 300 may comprise a base 310, a cover 320, and a handle 321. Cover 320 may be coupled to base 310 and may be configured to move between a closed position and an open position. According to an exemplary embodiment, base 310 may comprise a storage compartment and cover 320 may be configured to cover the storage compartment in the closed position and uncover the storage compartment in the open position. As shown schematically in FIGS. 10A and 10B, cover 320 may be configured to slide towards the open position. Handle 321 may be configured to move between a retracted position and an extended position. As shown schematically in FIG. 10B, cover 320 is shown at an intermediate position between the closed position and the open position; handle 321 may be exposed in the extended position when cover 320 is at the intermediate position. Handle 321 may be configured to move cover 320 relative to base 310. Handle 321 may be configured to move cover 320 from the open position towards the closed position. As shown schematically in FIG. 10B, cover 320 is shown at the intermediate position and handle 321 is shown exposed in the extended position when cover 320 is at the intermediate position. Handle 321 may be configured to be in the retracted position when cover 320 is at the closed position and in the extended position when cover 320 is at the open position. Handle 321 may be configured to move cover 320 from the open position towards the closed position.

Figure 11:
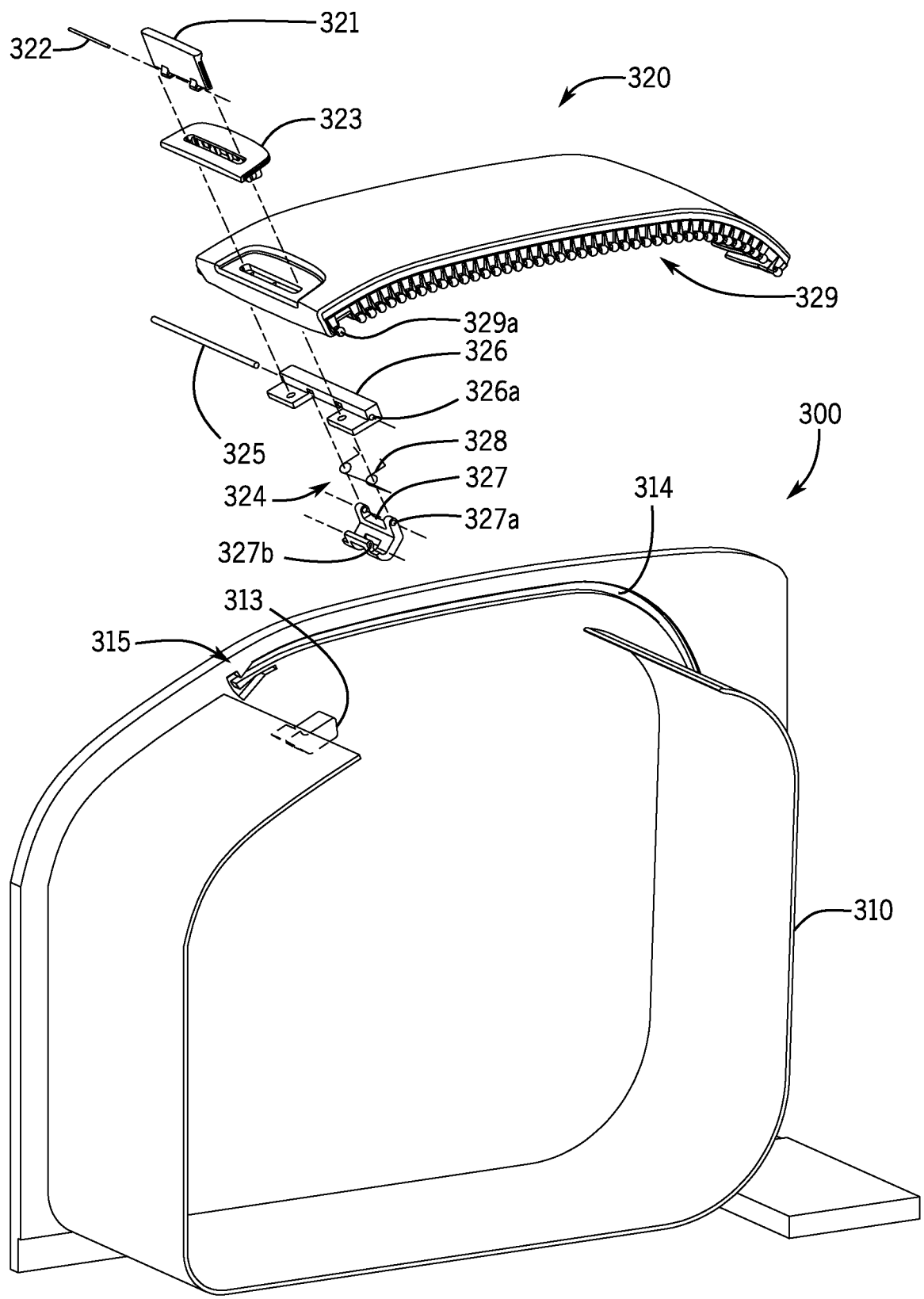
FIG. 11 is a schematic perspective exploded partial view of a vehicle interior component according to an exemplary embodiment.
Figure 12A:
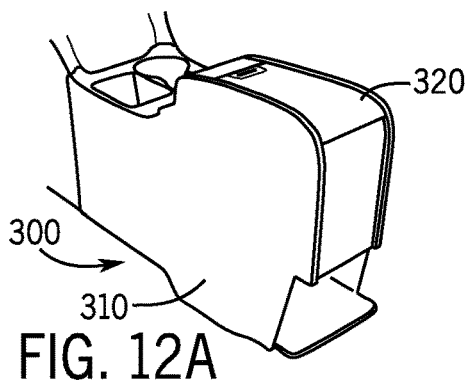
FIGS. 12A to 12H are schematic perspective views of a vehicle interior component according to an exemplary embodiment.
Figure 12B:
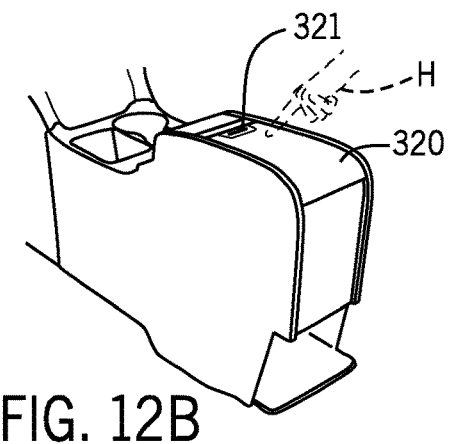
Figure 12C:
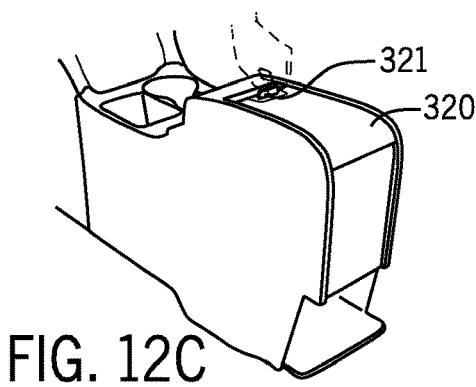
Figure 12D:
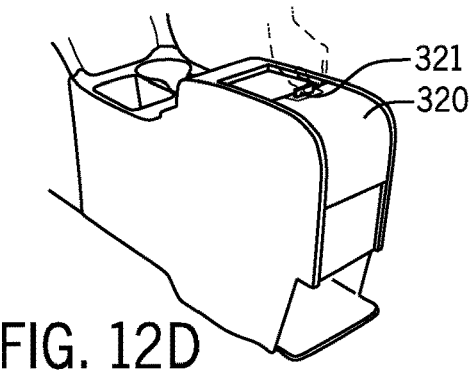
Figure 12E:
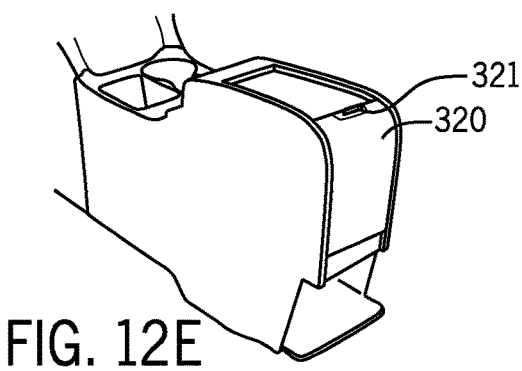
Figure 12F:
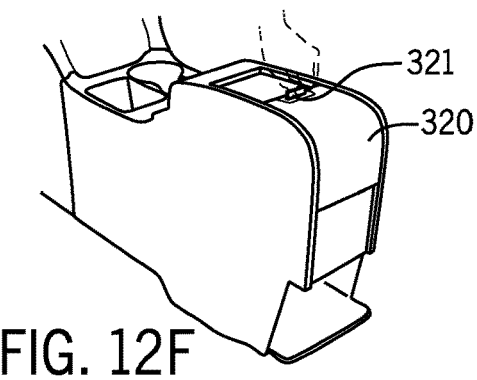
Figure 12G:
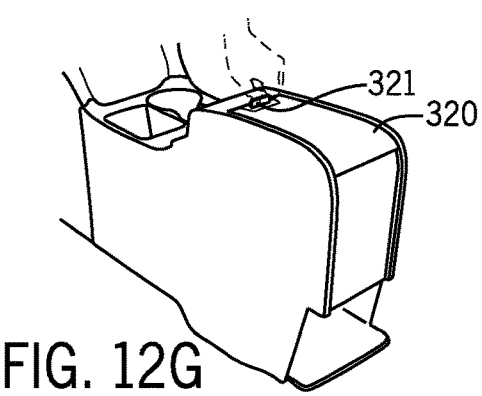
Figure 12H:
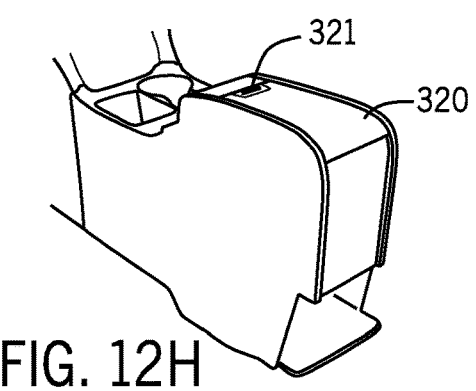

According to an exemplary embodiment as shown schematically in FIG. 11, a vehicle interior component 300 (e.g. console, floor console, center console, storage compartment, arm rest, etc.) may comprise a base 310, a cover 320 (e.g. door, tambour door, shade, blind, roller blind, etc.), a handle 321, a plate or bezel 323 and a mechanism 324. Base 310 may comprise a protrusion 313 and a track 314. Track 314 may comprise a latch 315.

According to an exemplary embodiment as shown schematically in FIG. 11, cover 320 may comprise a plurality of ribs 329 including a forward-most rib 329a offset from the rest of the plurality of ribs 329. Cover 320 may be configured to rest in track 314. Plurality of ribs 329 may be aligned parallel to each other and may be configured to conform to the curvature of track 314 on base 310. Each rib of the plurality of ribs 329 may comprise opposing protrusions configured to engage with track 314 to slide cover 320 between a closed position and an open position. According to an exemplary embodiment, forward-most rib 329a may be configured to engage with latch 315 to secure cover 320 in the closed position.

According to an exemplary embodiment, handle 321 may be configured to move between a retracted position and an extended position to facilitate movement of cover 320 between the open position and the closed position. Handle 321 may be flush-fit with cover 320 when handle 321 is in the retracted position and cover 320 is in the closed position. According to an exemplary embodiment, handle 321 may be exposed to a vehicle occupant to facilitate movement of cover 320 when handle 321 is in the extended position.

According to an exemplary embodiment as show schematically in FIG. 11, mechanism 324 may comprise a bracket 326, a spring or torsion spring 328, and a link 327 (e.g. member, pivot arm, pivot member etc.). Mechanism 324 may be configured to move handle 321 relative to cover 320. Link 327 may be coupled to handle 321 and spring 328. Spring 328 may be configured to move link 327 relative to cover 321. Bracket 326 may comprise a hole 326a and link 327 may comprise holes 327a and 327b. According to an exemplary embodiment, bracket 326, spring 328, and link 327 may be configured in a first hinge arrangement. The first hinge arrangement may be formed by inserting a pin 325 into hole 326a through spring 328 and hole 327a. According to an exemplary embodiment, spring 328 may be configured to provide tension on the first hinge arrangement to rotate link 327 such that handle 321 remains in the extended position unless link 327 is prevented from rotating by an external force. According to an exemplary embodiment, spring 328 may be configured to bias handle 321 in the extended position. According to an exemplary embodiment, spring 328 may be configured to move handle 321 from the retracted position into the extended position.

According to an exemplary embodiment as shown schematically in FIG. 11, bracket 326 may be mounted to an underside of cover 320. Bracket 326 may be rigidly attached to the underside of cover 320 and may be configured to move together with cover 320. According to an exemplary embodiment, a second hinge arrangement may be formed by inserting a pin 322 into holes on handle 321 and hole 327b on link 327. Rotation of link 327 may facilitate movement of handle 321 between the retracted position and the extended position. Link 327 may be configured to engage with protrusion 313 on base 310 such that protrusion 313 stops handle 321 from moving towards the extended position when cover 320 is at the closed position. According to an exemplary embodiment, when cover 320 is at the closed position, protrusion 313 may engage with the center of link 327 to center cover 320 within track 314 and provide an external force to prevent rotation of link 327 which keeps handle 321 in the retracted position. According to an exemplary embodiment, protrusion 313 may be configured to move handle 321 from the extended position to the retracted position.

According to an exemplary embodiment as shown schematically in FIG. 11, plate 323 may be attached to cover 320 between handle 321 and bracket 326 and may be configured to host handle 321. According to an exemplary embodiment, plate 323 may be configured to be flush with cover 320 when handle 321 is in the retracted position and provide a passage for handle 321 to move between the retracted position and the extended position.

According to an exemplary embodiment as shown schematically in FIGS. 12A to 12F, cover 320 of vehicle interior component 300 may move between the closed position and the open position. As shown schematically in FIG. 12A, cover 320 is shown at the closed position and is secured to base 310 by latch 315 and forward-most rib 329a. (See FIG. 11). As shown schematically in FIG. 12B, a force or press on cover 320 may be applied by a hand H to disengage cover 320 from base 310 and allow free movement of the cover 320 out of the closed position. As shown schematically in FIGS. 12C and 12D, cover 320 is shown partially open at an intermediate position and handle 321 is in the extended position. Cover 320 may progressively move towards the open position. According to an exemplary embodiment, hand H may push handle 321 to move cover 320 towards the open position. According to an exemplary embodiment, vehicle interior component 300 may comprise a self-opening mechanism similar to self-opening mechanism 230 that progressively moves cover 320 from the closed position to the open position. As shown schematically in FIG. 12E, cover 320 is shown at the open position and handle 321 remains in the extended position. According to an exemplary embodiment, handle 321 may be configured to facilitate movement of cover 320 between the open position and the closed position. As shown schematically in FIGS. 12F and 12G, hand H may push handle 321 to move cover 320 to the closed position. As shown schematically in FIG. 12H, when cover 320 is at the closed position, handle 321 may move to the retracted position.

Figure 13A:
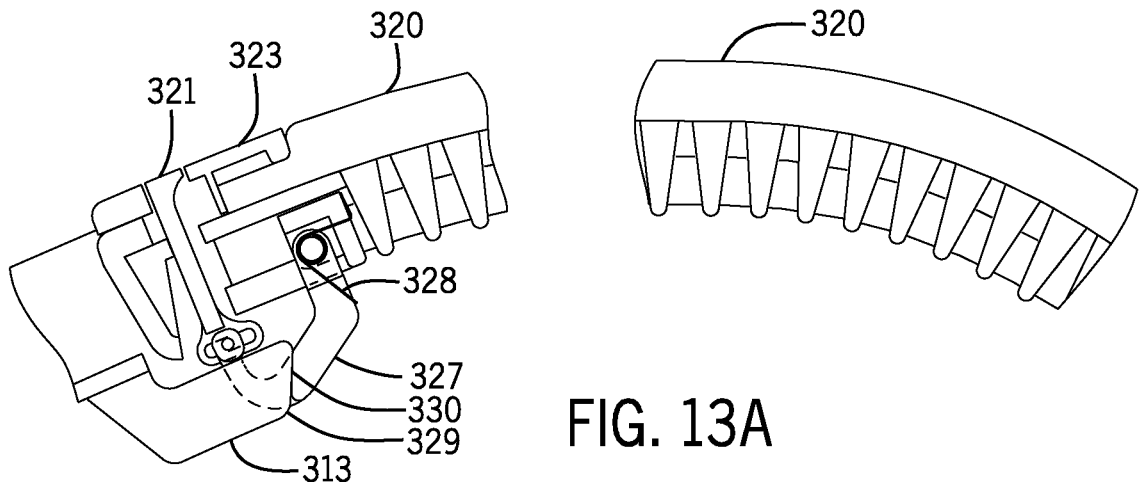
FIGS. 13A to 13C are schematic partial side views of a vehicle interior component according to an exemplary embodiment.
Figure 13B:
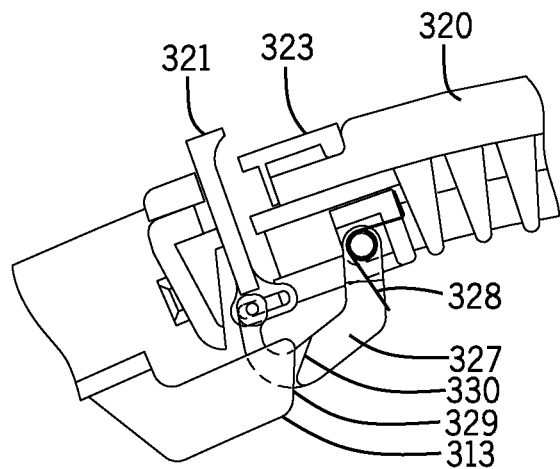
Figure 13C:
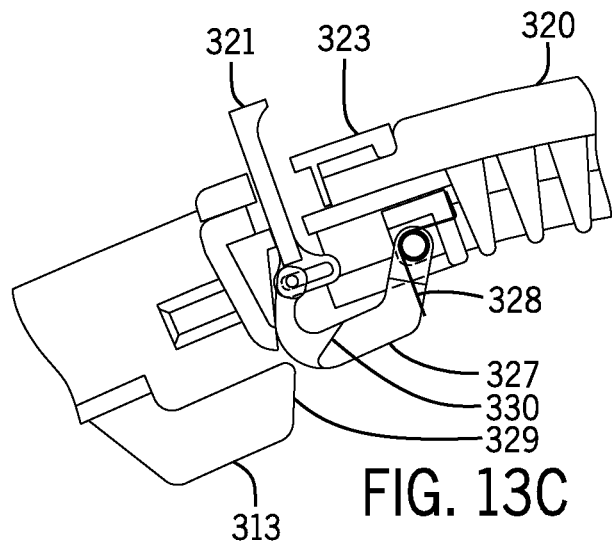
Figure 14A:
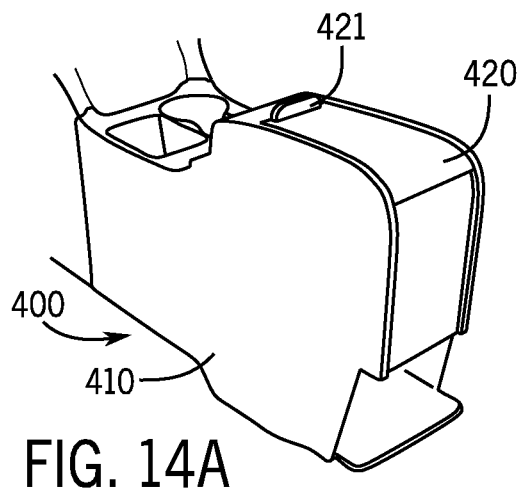
FIGS. 14A to 14F are schematic perspective views of a conventional vehicle interior component according to an exemplary embodiment.
Figure 14B:
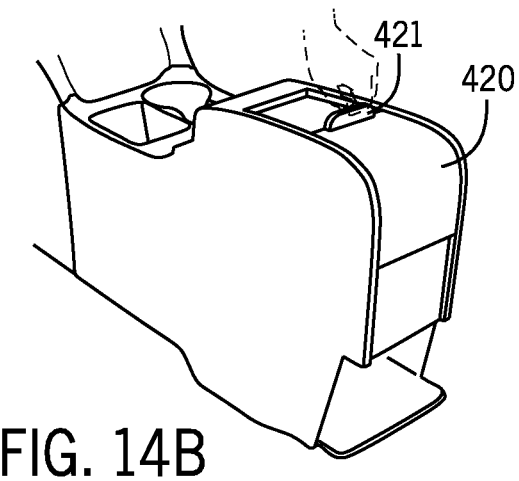
Figure 14C:
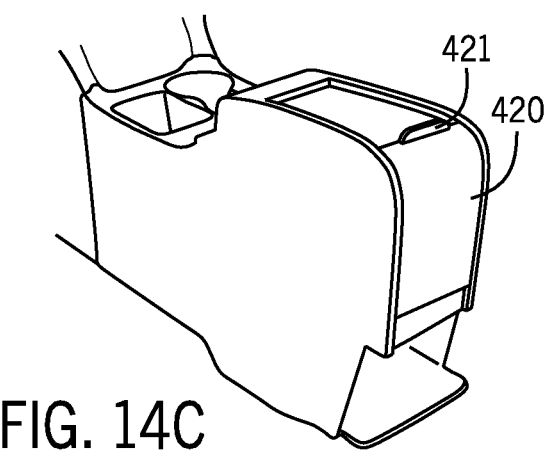
Figure 14D:
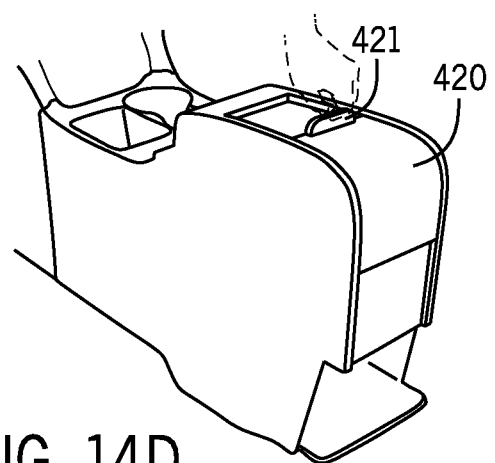
Figure 14E:
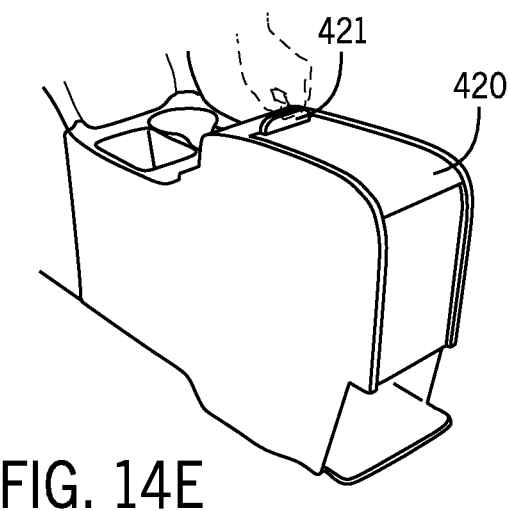
Figure 14F:
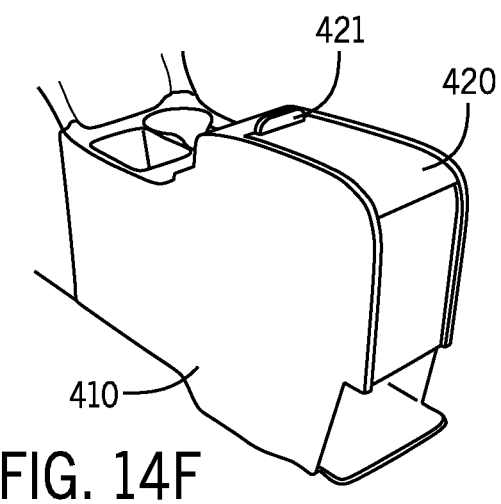

According to an exemplary embodiment as shown schematically in FIGS. 13A to 13C, cover 320 may be configured to slide between the closed position and the intermediate position. (See also FIGS. 12A to 12H). As shown schematically in FIG. 13A, cover 320 is shown at the closed position and handle 221 is in the retracted position. Handle 321 may be substantially aligned with plate 323 providing a flush-fit appearance on the visible side of the cover 320. Spring 328 may be engaged with link 327 to keep handle 321 at the retracted position. According to an exemplary embodiment, link 327 may be configured to translate the horizontal motion of cover 320 into vertical motion of handle 321. Protrusion 313 may be engaged with link 327 to prevent rotation of link 327 to keep handle 321 at the retracted position. According to an exemplary embodiment, protrusion 313 and link 327 may comprise opposing ramp portions 329 and 330 respectively. Ramp portion 329 of protrusion 313 may engage with ramp portion 330 of link 327 to prevent rotation of link 327.

According to an exemplary embodiment as shown schematically in FIG. 13B, cover 320 is shown at a position between the closed position and the intermediate position and handle 321 is shown partially extended from the top of cover 320. As cover 320 moves from the closed position toward the intermediate position handle 321 may gradually transition to the extended position. According to an exemplary embodiment, the rate at which handle 321 transitions to the extended position may be dependent on the force of spring 328, the length of link 327, the length of protrusion 313, and the angle of ramp portions 329 and 330. As shown schematically in FIG. 13C, cover 320 is shown at the intermediate position away from the closed position and handle 321 is in the extended position. Spring 328 may be configured to rotate link 327 in a direction to move handle 321 into the extended position. According to an exemplary embodiment, spring 328 may be configured to provide tension to keep handle 328 in the extended position (i.e. to prevent handle 321 from retracting).

A conventional vehicle interior component 400 with a base 410, a cover 420, and a handle 421 is shown schematically and representationally in FIGS. 14A to 14F with cover 420 moving between a closed position and an open position. As indicated schematically, handle 421 may be exposed when cover 420 is at the closed position or any position between the closed position and the open position. As indicated schematically in FIG. 14A, cover 420 is shown at the closed position and is latched to base 410. As indicated schematically in FIG. 14B, a hand H may push handle 421 to dislodge or unlatch cover 420 from base 410 to move cover 420 towards the open position. As indicated schematically in FIG. 14C, handle 421 may remain exposed when cover 420 is at the open position. As indicated schematically in FIGS. 14D and 14E, hand H is shown pushing handle 421 to move cover 420 from the open position to the closed position. As indicated schematically in FIG. 14F, cover 420 may be latched to base 410 when cover 420 is in the closed position.

Figure 15A:
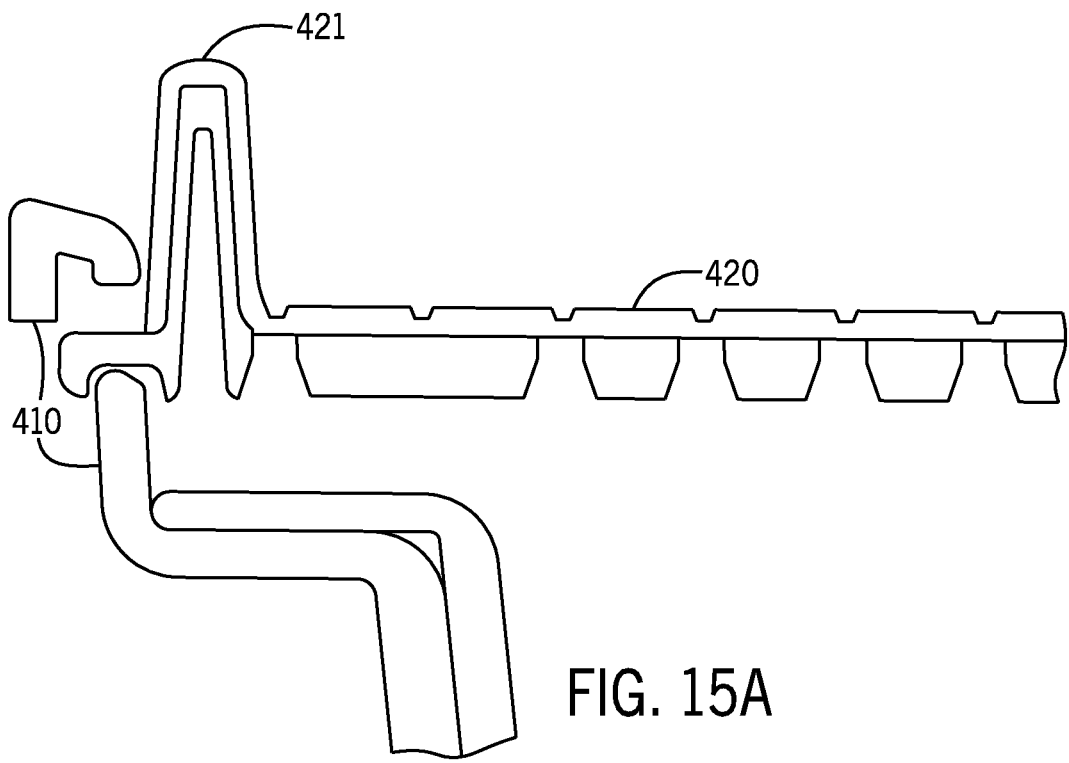
FIGS. 15A and 15B are schematic partial side views of a conventional vehicle interior component according to an exemplary embodiment.
Figure 15B:
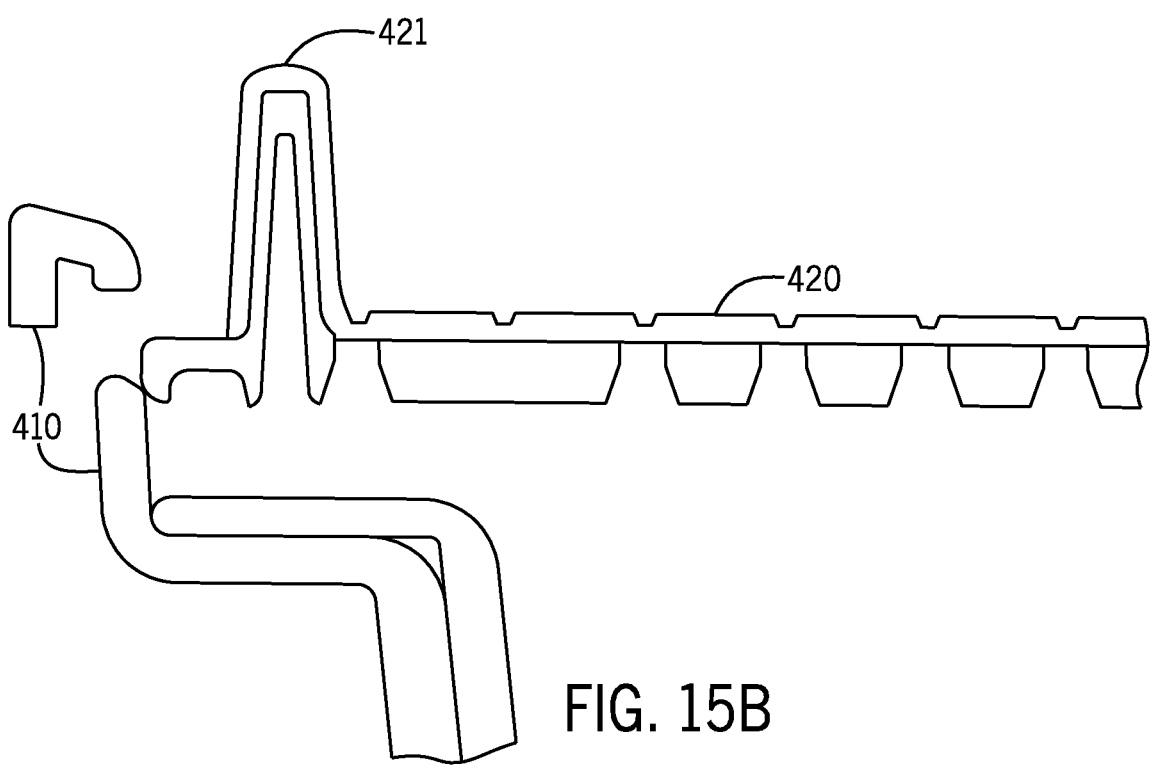

As indicated schematically in FIGS. 15A and 15B, cover 420 may slide between the closed position and an intermediate position. (See also FIGS. 14A to 14F). As indicated schematically in FIG. 15A, cover 420 is shown at the closed position and latched onto base 410. As indicated schematically in FIG. 15B, cover 420 is shown at the intermediate position away from the closed position and unlatched or dislodged from base 410. An external force provided by a hand may dislodge cover 420 from base 410 by flexing the top portion of cover 420.

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in the FIGURES. All such technology (e.g. as implemented in embodiments, modifications, variations, combinations, equivalents, etc.) is considered to be within the scope of the present inventions of the present patent document.

The invention claimed is:
1. A vehicle interior component comprising:
(a) a base;
(b) a cover coupled to the base configured to move between a closed position and an open position;
(c) a handle coupled to the cover configured to move between a retracted position and an extended position; and
(d) a mechanism configured to move the handle relative to the cover;
wherein the mechanism comprises a spring configured to move the handle relative to the cover.
2. The vehicle interior component of claim 1 wherein the handle is configured to be in the retracted position when the cover is in the closed position; and wherein the handle is configured to be in the extended position when the cover is in the open position.

3. The vehicle interior component of claim 1 wherein the handle is configured to be moved toward the retracted position when the cover moves from the open position to the closed position.

4. The vehicle interior component of claim 1 wherein the mechanism is configured to move the handle toward the extended position when the cover moves from the closed position toward the open position.

5. The vehicle interior component of claim 1 wherein the base comprises a protrusion; and wherein the mechanism is configured to engage the protrusion to move the handle from the retracted position toward the extended position.

6. The vehicle interior component of claim 1 wherein the base comprises a protrusion; and wherein the mechanism is configured to engage the protrusion to move the handle from the extended position toward the retracted position.

7. The vehicle interior component of claim 1 wherein the mechanism comprises a link coupled to the spring and configured to move the handle relative to the cover.

8. The vehicle interior component of claim 1 wherein the spring is configured to bias the handle toward the retracted position.

9. The vehicle interior component of claim 1 wherein the spring is configured to move the handle from the extended position to the retracted position.

10. The vehicle interior component of claim 1 wherein the spring is configured to bias the handle toward the extended position.

11. The vehicle interior component of claim 1 wherein the spring is configured to move the handle from the retracted position to the extended position.

12. The vehicle interior component of claim 1 further comprising a spring configured to move the cover from the closed position to the open position.

13. The vehicle interior component of claim 1 wherein the vehicle interior component comprises at least one of (a) a console, (b) a floor console, (c) a center console, (d) a storage compartment, (e) an arm rest; and wherein the cover comprises at least one of (a) a door, (b) a tambour door, (c) a shade, (d) a blind, (e) a roller blind.

14. A vehicle interior component comprising:
(a) a base;
(b) a cover coupled to the base configured to move between a closed position and an open position;
(c) a handle coupled to the cover configured to move between a retracted position and an extended position; and
(d) a mechanism coupled to the handle;
wherein the mechanism is configured to move the handle relative to the covers;
wherein the base comprises a projection configured to engage the mechanism at the closed position.

15. The vehicle interior component of claim 14 wherein the mechanism is configured to engage with the base to move the handle toward the extended position.

16. The vehicle interior component of claim 14 wherein the base comprises a projection configured to engage the mechanism at the open position.

17. The vehicle interior component of claim 14 wherein the mechanism is configured to engage with the base to move the handle toward the retracted position.

18. A vehicle interior component comprising:
(a) a base;
(b) a cover coupled to the base configured to move between a closed position and an open position;
(c) a handle coupled to the cover configured to move between a retracted position and an extended position; and
(d) a spring configured to move the cover from the closed position to the open position.

19. A vehicle interior component comprising:
(a) a base;
(b) a cover coupled to the base configured to move between a closed position and an open position;
(c) a handle coupled to the cover configured to move between a retracted position and an extended position; and
(d) a mechanism configured to move the handle relative to the cover;
wherein the base comprises a protrusion;
wherein the mechanism is configured to engage the protrusion to move the handle (a) from the retracted position toward the extended position or (b) from the extended position toward the retracted position.

* * * * *